United States Patent
Schneider et al.

(10) Patent No.: US 9,340,669 B2
(45) Date of Patent: May 17, 2016

(54) COMPOSITION, IN PARTICULAR A BLOCKING AGENT COMPOSITION FOR FIXING BLANKS TO OPHTHALMIC OR OPTICAL LENSES

(75) Inventors: Gunter Schneider, Marburg (DE);
Stephan Huttenhuis, Marburg (DE);
Ferdinand Achenbach, Breiderbach-Wolzhausen (DE)

(73) Assignee: SCHNEIDER GMBH & CO. KG, Fronhausen (DE)

( * ) Notice: Subject to any disclaimer, the term of this patent is extended or adjusted under 35 U.S.C. 154(b) by 752 days.

(21) Appl. No.: 13/390,448

(22) PCT Filed: Aug. 12, 2010

(86) PCT No.: PCT/EP2010/004954
§ 371 (c)(1),
(2), (4) Date: May 8, 2012

(87) PCT Pub. No.: WO2011/018231
PCT Pub. Date: Feb. 17, 2011

(65) Prior Publication Data
US 2012/0208036 A1  Aug. 16, 2012

(30) Foreign Application Priority Data

Aug. 14, 2009 (DE) .......................... 10 2009 037 360
Sep. 21, 2009 (DE) .......................... 10 2009 042 005
Sep. 30, 2009 (DE) .......................... 10 2009 043 727

(51) Int. Cl.
| | |
|---|---|
| C08L 63/00 | (2006.01) |
| B24B 13/005 | (2006.01) |
| B29D 11/00 | (2006.01) |
| C08K 5/053 | (2006.01) |
| C08L 67/02 | (2006.01) |
| G02B 7/02 | (2006.01) |

(52) U.S. Cl.
CPC .............. *C08L 63/00* (2013.01); *B24B 13/005* (2013.01); *B24B 13/0057* (2013.01); *B29D 11/00942* (2013.01); *C08K 5/053* (2013.01); *C08L 67/02* (2013.01); *G02B 7/025* (2013.01); Y10T 428/31786 (2015.04)

(58) Field of Classification Search
CPC ............. B24B 13/005; B24B 13/0057; B29D 11/00942; C08K 5/053; C08L 63/00; C08L 67/02; G02B 7/025
See application file for complete search history.

(56) References Cited

U.S. PATENT DOCUMENTS

| | | | | |
|---|---|---|---|---|
| 3,404,018 | A | * | 10/1968 | Hicks .............................. 106/252 |
| 4,430,479 | A | * | 2/1984 | Merton et al. ................. 525/127 |
| 5,518,571 | A |   | 5/1996 | Puerkner et al. |
| 5,885,700 | A | * | 3/1999 | Weldon et al. ................. 428/212 |
| 7,935,402 | B2 |   | 5/2011 | Cole et al. |
| 2009/0071602 | A1 |   | 3/2009 | Weippert |

FOREIGN PATENT DOCUMENTS

| | | |
|---|---|---|
| DE | 17 69 154 A1 | 9/1971 |
| DE | 30 35 989 A1 | 4/1981 |
| DE | 10 304 388 A1 | 8/2004 |
| DE | 10 2005 038 063 A1 | 2/2007 |
| EP | 0 968 074 B1 | 9/1998 |
| EP | 2 036 935 A1 | 3/2009 |
| GB | 1176788 A | 1/1970 |
| WO | 92/03515 A1 | 3/1992 |
| WO | 98/41359 A1 | 9/1998 |
| WO | 2008/137545 A1 | 11/2008 |

* cited by examiner

*Primary Examiner* — Robert Jones, Jr.
(74) *Attorney, Agent, or Firm* — Edward E. Sowers; Brannon Sowers & Cracraft PC

(57) ABSTRACT

The present invention relates to a composition, in particular a blocking agent composition, in particular for fixing blanks for ophthalmic and/or optical lenses, preferably plastics material-based ophthalmic spectacle glass blanks. The composition comprises a mixture containing (a) at least one polyol (polyalcohol) and (b) at least one organic polyester. In addition, the present invention relates to a method for producing a composite structure, which comprises a carrier having a blank fixed thereon, and the composite structure as such. Furthermore, the present invention relates to a method for producing spectacle glass, in particular plastics material-based spectacle glass, and the spectacle lenses that can be obtained therefrom. Finally, the present invention relates to the use of the composition according to the invention in the production of ophthalmic and optical lenses, and for fixing the blank to a carrier.

14 Claims, No Drawings

COMPOSITION, IN PARTICULAR A BLOCKING AGENT COMPOSITION FOR FIXING BLANKS TO OPHTHALMIC OR OPTICAL LENSES

CROSS-REFERENCES TO RELATED APPLICATIONS

This application is a National Stage filing of International Application PCT/EP 2010/004954, filed Aug. 12, 2010, entitled COMPOSITION, IN PARTICULAR A BLOCKING AGENT COMPOSITION FOR FIXING BLANKS TO OPHTHALMIC OR OPTICAL LENSES claiming priority to German Application DE 10 2009 037 360.8.2, filed Aug. 14, 2009; German Application DE 10 2009 042 005.3, filed Sep. 21, 2009; and German Application DE 10 2009 043 727.4 filed Sep. 30, 2009. The subject application claims priority to PCT/EP 2010/004954, and to German Application DE 10 2009 037 360.8.2, German Application DE 10 2009 042 005.3, and German Application DE 10 2009 043 727.4, and incorporates all by reference herein, in their entirety.

BACKGROUND OF THE INVENTION

The present invention relates to the field of producing ophthalmic and/or optical lenses which can be designed, for example, in the form of in particular plastics material-based spectacle glasses or plastic spectacle glasses, starting from corresponding lens blanks or spectacle glass blanks.

For the purposes of subsequent machine processing—in particular in the form of grinding, machining and/or polishing operations—to obtain the finished lenses or spectacle glasses, blanks of this type are generally firstly fixed with the help of a blocking agent composition to a carrier or block (block piece), and/or stuck to this, in order, in so doing, to ensure as rigid and secure as possible a fixing of the blank during the processing operations, which can considerably increase the quality of the finished product.

In particular, the present invention relates to an (adhesive) composition, in particular a blocking agent composition or a blocking agent with which the ophthalmic or optical lenses or plastics material-based blanks to be processed can be fixed to a carrier or block for the purposes of further processing.

Moreover, the present invention relates to a method for fixing the aforementioned blanks to a carrier structure such as a block or block piece, using the (adhesive) composition according to the invention.

Furthermore, the present invention relates to a composite which has a carrier or block or a block piece and also a blank of the aforementioned type fixed to the carrier, where the blank is fixed to the carrier by means of the composition according to the invention.

Furthermore, the present invention relates to a process for producing an ophthalmic or optical lens, preferably a plastics material-based spectacle glass, where a further processing of the blank fixed to a block by means of the composition according to the invention takes place in order to obtain, in this way, the finished product in the form of an ophthalmic or optical lens, preferably a plastics material-based spectacle glass. The resulting product here can optionally also be subjected to further (post-) processing steps, such as a coating treatment or a coating.

Moreover, the present invention relates to an ophthalmic or optical lens, thus those which are obtainable by the method according to the invention.

Furthermore, the present invention relates to the use of the composition in producing ophthalmic and/or optical lenses, preferably plastics material-based spectacle glasses.

Finally, the present invention relates to the use of the composition, in particular blocking agent composition, according to the invention for fixing a spectacle glass blank to a carrier, in particular a block piece.

In the course of the production of in particular plastics material-based spectacle glass blanks or ophthalmic and/or optical lenses, in the prior art, the procedure has generally involved fixing a corresponding blank based on plastic material, which is often present in poured form with an optical quality, to a carrier structure or a block in order to allow machine processing of the side of the blank facing the block and/or a shaping of the blank per se. The blank can generally be spherical in shape, where the particular sides of the blank can have radii formed independently of one another. Equally, however, the blank can also have at least one flat side. The blank can be fixed to the carrier structure or the block with one of its spherically shaped sides and, in the case of the presence of a flat side, preferably with the flat side. In this way, on the one hand, the optical properties of the blank can be modified and, on the other hand, a shaping of the spectacle glass, for example with regard to a tailoring to a spectacle frame, can be made possible. In this connection, methods known per se for example to the person skilled in the art on the basis of machining, milling, turning, grinding, polishing or the like are used.

The carrier or block provided for accommodating the blank functions here equally as coupling part for accommodation in a corresponding processing machine, where the coupling section of the block in this regard is generally arranged and/or configured on the side of the carrier facing the blank to be fixed. In the course of the fixing or attachment of the blank to the carrier or block, the procedure generally is such that, between block on the one hand and blank on the other hand, a cavity is established which is filled or refilled with an adhesive or a blocking agent composition in order, in this way, to make possible a fixing of the blank. After the machine processing of the blank has taken place, the blank or the resulting spectacle glass or the resulting optical lens is detached from the composite, which can take place for example using mechanical and/or thermal methods.

For the purposes of fixing or for refilling the cavity, the spectacle glass blank to be blocked is generally arranged above the block or laterally to the block inclined or tilted in this case, where, in both cases, the blank is arranged spaced apart from the face or receiving surface of the block. To provide a cavity to be filled by the adhesive mass or blocking agent composition, a sealing means, in particular a blocking ring, can be used for the sealing limitation and thus to a certain extent as sealing or sealing device (sealing ring) and also optionally a guide cap between the spectacle glass blank on the one hand and the block piece on the other hand. The formation or sealing of the cavity can optionally be flanked by a so-called guide cap and/or by a receiving cap, which in general can be arranged below the blank and can be assigned functionally to a blocking machine used in the course of the blocking. In general, the volume of the cavity is about 25 to 40 $cm^3$, where the cavity is filled with a corresponding amount of adhesive or blocking agent composition. In general, to accommodate the carrier, the block has a diameter of about 43 mm, in which case it is usually provided that the blank, which generally has a diameter of about 60 to 85 mm, is fixed in particular in a concentric manner to the block such that the blank juts out over the block along the entire periphery of the block. The blank can likewise also be fixed to the block in the form of a prismatic tilting and/or in a decentered manner.

In general, the procedure can be such that, for blocking a spectacle glass blank on a block or block piece, both the block piece and also the spectacle glass blank are placed in a blocking device or machine. The blocking machine can have a receiving cap for receiving the block piece. For the purposes of lining up the block piece or the receiving cap relative to the spectacle glass blank, moreover, a guide cap can be provided, which can be stored e.g. above a swivel plate in the blocking machine. The spectacle glass blank to be blocked can be positioned above the block piece where, for the purposes of forming a cavity to be filled with the block composition, a blocking ring, configured as sealing limit or sealing means, and/or a guide cap can be arranged between the spectacle glass blank and the block piece or the receiving cap. In this connection, the blocking ring can provide a seal, for the sealing formation of the cavity against the spectacle glass blank and also against the guide cap and/or the block piece. The guide cap can provide a seal against the receiving cap and/or the block piece. The block composition can be introduced into the cavity via a filling opening attached in particular in the blocking ring.

A device for blocking a spectacle glass blank on a block or a block piece by means of a bonding mass is described e.g. in DE 30 35 989 A1. Using the device described therein, a low-melting metal alloy can be used as bonding mass which, on account of gravitational force, is filled from a storage container into the cavity by means of a filling point.

DE 103 04 388 A1 relates to a block piece for accommodating a blank which is designed to be machinable. In this connection, however, the blank is not fixed to the carrier using a thermoplastic adhesive mass. Instead, an adhesive film is used for the fixing where, in this connection, from time to time, a holding part, preformed specifically with regard to the blank, has to be used in order to permit fixing of the blank over the largest possible area.

Furthermore, DE 10 2005 038 063 A1 relates to a preformed block piece with three receiving points for accommodating a lens blank where, as a result of a specific configuration of the block piece, the amount of adhesive agent to be used is intended to be reduced to a minimum.

EP 0 851 800 B1 also relates to a block for lens blanks in which the lens blank, however, is fixed by means of a mass, that has become solid, of a thermoplastic holding mass based on a homopolymer or copolymer of ϵ-caprolactone.

In the prior art, numerous approaches are known for the fixing or adhesion of blanks for ophthalmic or optical lenses or for spectacle glasses on carrier structures for the purposes of subsequent machine processing, where a primary objective can be considered that of permitting a secure and durable connection between lens or spectacle glass blank on the one hand and carrier or block piece on the other hand, so that the unit resulting in this way with the blank can withstand the forces which arise during the subsequent machine processing.

In this connection, in the prior art, metal alloys are often used as adhesive mass which, in general, have a low melting temperature in the region of about 50° C., in order to permit on the, in particular semi-finished, surface of a blank a bonding or fixing with a block facing the blank such that, in this way, the side of the spectacle glass blank facing the block is accessible to subsequent processing. An attachment of this type is generally also referred to in the prior art as "lens blocking".

A metal alloy, known in the prior art, with low melting temperature can include e.g. the elements bismuth, tin, lead, cadmium, indium and antimony. An alloy of this type has a lower melting point than the individual elements, which is sometimes of importance during the fixing of plastics material-based blanks for avoiding temperature-induced damage.

The disadvantage of alloys of this type in the prior art is the fact that they pose a considerable environmental and/or health risk, particularly since numerous ingredients of the alloy are severely toxic and sometimes are also regarded as so-called protoplasma toxins which, upon entry into the human body, for example as a result of inhalation or skin absorption, can lead to health impairment. These risks are of importance particularly against the background that, in the course of the processing of spectacle glass blanks, on account of the processing methods used, dust particles, fine dust particles or smoke particles can be released, which can lead to a considerable exposure of the environment to the harmful substances. Furthermore, with regard to the metal alloys known in the prior art, it is disadvantageous that these are firstly expensive, especially since they cannot be recycled per se, and that, secondly, also an only limited use spectrum is possible to the effect that, especially on account of the high material costs, only certain blanks with specific geometries can be fixed.

As alternatives to the metal alloys described above, it has also been attempted in the prior art to replace these by plastics material compositions, which include, for example, thermoplastic resins. However, compositions of this type generally do not always have optimum physical properties. In particular, compositions of this type are relatively brittle, and also the cohesive force and tensile strength are not always optimal. Moreover, compositions of this type, especially during the processing of the blank, can become deformed or become too soft, which has an adverse effect on the quality of the spectacle glass to be produced since the surface can become irregularly shaped. Moreover, the cleaning of the spectacle glasses or lenses from these compositions is difficult and sometimes very time-intensive, which further increases the costs of the production of spectacle glasses overall.

EP 0 968 074 B1 relates to a thermoplastic lens receiving material based on plastics material, the focus being in particular on the use of homopolymers or copolymers of ϵ-caprolactone for the composition described therein. The compositions described therein are disadvantageous in so far as the starting materials are relatively expensive and the compositions, moreover, do not have good thermostability. Also, the adhesive properties are sometimes not always adequate.

BRIEF SUMMARY OF THE INVENTION

The object of the present invention is therefore to provide adhesive compositions or blocking agents which are suitable in particular for the fixing of spectacle glass blanks on so-called blocks or block pieces which avoid, or at least lessen, the disadvantages of the prior art described above.

In particular, one object of the present invention lies in the provision of (adhesive) compositions or blocking agent compositions which are intended to make possible a substitution of the low-melting metal alloys used hitherto, where, in this connection, a high adhesive strength to the lens blank or to the block piece, a high internal rigidity at room temperature, exceptional curability, in particular while avoiding the formation of shrinkage cracks during curing and/or during cooling, and a good three-dimensional stability during curing and during lens processing should be ensured. Moreover, the adhesive agent provided according to the invention should permit a simple thermal and/or mechanical deblocking of the lens in a suitable temperature range which does not lead to damage of the lens or the spectacle glass. Moreover, the composition provided according to the invention should be recyclable and reusable. In particular, the composition provided according to the invention should be cost-effective. Moreover, the composition should not be toxic.

To achieve the aforementioned object, the present invention proposes—according to a first aspect of the present invention—a composition, in particular a blocking agent composition (adhesive composition), as per the present disclosure. Further advantageous embodiments are similarly disclosed.

The present invention further provides—according to a second aspect of the present invention—the method according to the invention for fixing blanks for ophthalmic and/or optical lenses on a carrier or block piece.

In turn, the present invention further provides—according to a third aspect of the present invention—the composite according to the invention which includes a block piece and a blank fixed thereon using the blocking agent composition according to the invention for ophthalmic and/or optical lenses.

Moreover, the present invention further provides—according to a fourth aspect of the present invention, the method according to the invention for producing an ophthalmic and/or optical lens, where a blank fixed to a carrier or block using the blocking agent composition according to the invention is processed in particular by machine to produce the ophthalmic and/or optical lens.

Moreover, the present invention provides—according to a fifth aspect of the present invention, the spectacle glasses or lenses per se produced by the method according to the invention.

Furthermore, the present invention provides—according to a sixth aspect of the present invention—the use according to the invention of the composition according to the invention in the production of ophthalmic and/or optical lenses, preferably of plastics material-based spectacle glasses.

Finally, the present invention further provides—according to a seventh aspect of the present invention—the use according to the invention of the composition according to the invention for the fixing of a spectacle glass blank on a carrier.

It goes without saying that in the text below, those embodiments and explanations which are specified only in respect of a single aspect of the present invention apply equally accordingly also to the other aspects of the present invention without needing to be expressly mentioned.

For all relative or percentage weight-based quantitative data specified below, it is to be taken into consideration that these are to be selected by the person skilled in the art within the context of the composition according to the invention in such a way that they always add up to 100% by weight in total including all ingredients, including additives, refining agents and the like, in particular as defined below. However, this is self-evident for the person skilled in the art.

Moreover, the person skilled in the art can deviate from the quantitative data listed below depending on the application or specific to the individual case, without departing from the scope of the present invention.

Furthermore, for all stated parameters and values below, these can be determined using determination methods that are customary and well known per se to the person skilled in the art, particularly on the basis of relevant standards (such as DIN, DIN EN, ASTM, ISO etc.), which can also be used supplementary to or alternatively to the standards specified below. If specific standards are not specified below, this means that the person skilled in the art is able to select the particular determination standard accordingly against the background of the respective parameter and/or value determination.

Moreover, it should be noted that all of the data below with regard to the average molar mass or the average molecular weight refer to the so-called weight-average molecular weight or the weight-average molar mass.

DETAILED DESCRIPTION OF THE INVENTION

The applicant has now surprisingly found that the problem described above and/or the objective described above can be solved or achieved by providing a blocking agent composition which comprises a mixture which comprises (a) at least one polyol (polyalcohol) and (b) at least one organic polyester.

The present invention thus provides—according to a first aspect according to the invention—a composition, in particular a blocking agent composition, especially for the fixing of blanks for ophthalmic and/or optical lenses, preferably plastics material-based spectacle glass blanks, where the composition comprises a mixture, where the mixture comprises (a) at least one polyol (polyalcohol) and
(b) at least one organic polyester.

A particular feature of the present invention is therefore in particular to be considered that, according to the invention, a composition, in particular a blocking agent composition, is provided which, as a result of the specific combination of at least one polyol or polyalcohol on the one hand and at least one organic polyester on the other hand, has excellent properties with regard to its use for the fixing of ophthalmic or optical lens blanks or blanks of plastics material-based spectacle glasses on carriers, such as block pieces.

The composition according to the invention is thus suitable in an excellent manner as blocking agent in the course of the production of in particular plastics material-based spectacle glasses. In this connection, the composition according to the invention is equally suitable as exceptional replacement for adhesives known in the prior art, in particular on the basis of metal alloys, where the composition according to the invention is characterized to a particular extent by the fact that it is nontoxic since it is free from those heavy metals.

Moreover, the composition according to the invention is characterized by exceptional pressure-sensitive adhesiveness, meaning that a good and durable adhesive bond to the blank to be fixed on the one hand and to the carrier on the other hand results.

A further central advantage of the composition according to the invention is to be considered the fact that the composition, upon curing and/or during the processing of the blank, does not become deformed, or at best becomes only slightly deformed, which leads to high quality or optical precision of the finished spectacle glass since the blank, even in the event of vigorous stressing in the course of the processing operations (machining, milling, polishing etc.), is bonded to a certain extent immovably and firmly with the carrier. As a result of the high pressure-sensitive adhesiveness or stickiness of the blocking agent composition according to the invention, the resulting composite of carrier, blocking agent and blank can thus withstand the high physical forces that arise during processing. Moreover, the composition according to the invention does not have a tendency to form shrinkage cracks upon cooling and/or upon curing.

Moreover, the softening point or melting point or the melting range of the composition according to the invention is selected such that there is high compatibility with the blank and the latter is not damaged by the adhesive mass, which is heated and converted to a flowable state in this way, during the filling of the cavity described above.

Furthermore, the composition according to the invention is characterized in that it permits a simple deblocking of the lens from the carrier, which can take place, for example, in the course of a thermal and/or mechanical deblocking, i.e. detachment of the processed lens or the spectacle glass from the carrier.

As regards the processing of the fixed blank, it is moreover significant that the composition according to the invention is itself machinable and thus, to a certain extent—in particular if the block is also produced to be machinable per se—a processing of the blank can also take place in the area of the adhesion, which considerably simplifies process-related handling, meaning that, in this way, for example ellipsoidal shapes of the blank can also be realized. Moreover, as a result of the property according to which the blocking agent composition according to the invention is itself machinable, a "fraying" or a breakage of edges in the overlapping region between blank on the one hand and adhesive on the other hand is effectively prevented. Any residues remaining on the spectacle glass can equally be removed easily following processing. This is because the compositions according to the invention can ideally be removed from the lens by mechanical means, in which case the compositions according to the invention can be removed from the lens and the block piece without major effort and without leaving a residue. Detached material particles of the composition according to the invention can also be removed easily and without leaving a residue.

A further central advantage of the composition according to the invention is considered to be the fact that it is recyclable and reusable and can thus be used in particular for a large number of blocking operations.

Moreover, the composition according to the invention is cost-effective which—in addition to the excellent machinability of the composition according to the invention, permits a complete under-blocking of the blank also for reasons of cost. In particular, a complete under-blocking of blanks with a nonplanar structure can also take place.

Last but not least, the present invention is characterized in that a blocking agent composition is provided which is problem-free with regard to its production and is based on basic substances that are generally commercially available and which are relatively cost-effective, meaning that the composition according to the invention is also an excellent product with regard to cost optimization. Furthermore, it is also significant for the cost aspect that the composition according to the invention can be recycled directly and can be used for a large number of successive fixing operations.

As a result, a composition according to the invention is thus provided which, besides excellent adhesive properties and rheological properties, is moreover thermally stable and also acceptable in terms of health.

A further advantage of the composition according to the invention is considered to be the fact that the composition can be prepared in a simple manner. Thus, the preparation can take place for example in the course of mixing operations, with heating of these substances, that are well-known per se to the person skilled in the art, where, in this regard, in particular a homogeneous thorough mixing of the ingredients is carried out. In this connection, the order of addition and the temperature sequence in the course of the preparation of the composition according to the invention is at least essentially unimportant.

In order to permit a particularly good fixing of the blank, it is envisaged according to one embodiment particularly preferred according to the invention that the composition according to the invention is thermoplastic. Equally, it can be provided that the composition according to the invention has a heat-sticky structure. This leads to good processing (filling of the cavity with or after heating), and also to excellent stickiness of the composition.

Moreover, within the context of the present invention, it can be provided that the composition has a melting range or a melting temperature in the range from 50 to 120° C., in particular 55 to 110° C., preferably 60 to 100° C., preferably 60 to 90° C., particularly preferably to 85° C. The melting temperature or the melting range can be determined by methods that are well-known per se to the person skilled in the art, for example by means of differential calorimetric methods, e.g. on the basis of DIN ISO 3146 (in particular method C). On account of the achieved setting of the melting range or of the melting temperature, it is ensured that the blank, which is formed in particular on a plastics material-basis, or consists of plastics material, is not thermally damaged per se, especially when the adhesive mass, which is heated and in so doing converted to a flowable state, is introduced into the cavity between blank and carrier.

In this connection, the composition according to the invention should be flowable above the melting range or the melting temperature, in particular above a temperature from 60° C. to 100° C. Furthermore, the composition should have, above the melting range or the melting temperature, in particular at a temperature of 60 to 100° C., a dynamic viscosity in the range from 100 to 50 000 mPa·s, in particular 250 to 30 000 mPa·s, preferably 500 to 25 000 mPa·s, preferably 750 to 20 000 mPa·s, particularly preferably 1000 to 18 000 mPa·s. In particular, the composition according to the invention has a dynamic viscosity in the range from 5000 to 30 000 mPa·s, in particular 10 000 to 20 000 mPa·s, at a temperature of 65° C., and/or in the range from 4000 to 20 000 mPa·s, in particular 5000 to 15 000 mPa·s, at a temperature of 70° C., and/or in the range from 2000 to 15 000 mPa·s, in particular 3000 to 12 000 mPa·s, at a temperature of 75° C. and/or in the range from 100 to 5000 mPa·s, in particular 250 to 3000 mPa·s, at a temperature of 130° C. This permits good fillability of the cavity present between carrier and blank, where at the same time the formation of residual voids and/or air bubbles is effectively prevented. Moreover, the filling rate is increased, which permits high throughputs. The viscosity can be determined on the basis of methods that are well-known per se to the person skilled in the art, for example on the basis of a method using parallel plates. For example, the viscosity of the composition according to the invention can be determined on the basis of DIN 53019.

As far as the composition according to the invention is further concerned, it should have a density p, determined at a temperature of 20° C., in the range from 0.9 to 1.5 $g/cm^3$, in particular 1 to 1.4 $g/cm^3$, preferably 1.1 to 1.3 $g/cm^3$, preferably about 1.2 $g/cm^3$. The density can be determined for example on the basis of DIN 51757.

The aforementioned in particular physical parameters of the composition according to the invention lead in particular to an excellent applicability and/or handling in the course of the fixing of spectacle glass blanks or blanks for optical lenses, in particular since the flow behavior and/or the rheological properties and also the melt behavior are optimized with regard to the blank to be fixed and the filling of the cavity.

As stated above, the composition according to the invention has at least one polyol, which is generally an organic compound which has two or more hydroxyl groups, in particular a plurality of hydroxyl groups. In particular, the polyol is an amorphous polyol.

Within the context of the present invention, as regards the aforementioned properties of the composition according to the invention, particularly good results are obtained if the composition (a) comprises the polyol in amounts of from 5 to 50% by weight, in particular 10 to 45% by weight, preferably 20 to 40% by weight, preferably 25 to 35% by weight, based on the composition.

The (a) polyol used according to the invention for the composition should have a hydroxyl number in the range from 350 to 600 mg KOH/g, in particular 400 to 550 mg KOH/g, preferably 425 to 525 mg KOH/g, preferably 450 to 550 mg KOH/g. The hydroxyl number can be determined, for example, on the basis of the DIN 53240 or DIN 53240-2.

It is equally advantageous if (a) the polyol has an acid number in the range from 1 to 15 mg KOH/g, in particular 2 to 12 mg KOH/g, preferably 5 to 10 mg KOH/g, and/or if (a) the polyol has an acid number of at most 15 mg KOH/g, in particular at most 12 mg KOH/g, preferably at most 10 mg KOH/g. The acid number can be determined e.g. in accordance with DIN 53402 or DIN EN ISO 2114.

Moreover, it can be provided according to the invention that (a) the polyol has a hydroxyl equivalent weight of from 100 to 135, in particular 105 to 130, preferably 110 to 125, preferably 112 to 125.

In order to further improve the flow properties or the rheological properties of the composition according to the invention, it can be provided according to the invention that (a) the polyol has a Brookfield viscosity of from 1000 to 3500 mPa·s, in particular 1500 to 3000 mPa·s, preferably 1700 to 2500 mPa·s, at a temperature of 25° C. and at 70% in propylene glycol monomethyl ether acetate (PM acetate).

Furthermore, it can be provided according to the invention that (a) the polyol has a melting range or a melting temperature in the range from 10 to 120° C., in particular 20 to 100° C., preferably 30 to 90° C., preferably 40 to 80° C., particularly preferably 50 to 60° C., where, in this regard, equally differential calorimetric methods can be used, as described above.

The properties of the composition according to the invention with regard to their use are envisaged according to the invention, as blocking agent composition for the fixing of blanks for optical lenses and/or for spectacle glasses can be further improved by using a very specific polyol as regards the composition according to the invention:

Thus, it can be provided according to the invention that (a) the polyol is the reaction product of bisphenol A epoxide on the one hand and dimethylolpropionic acid on the other hand. Here, (a) the polyol should have at least two bisphenol A units, preferably two bisphenol A units, and at least one dimethylolpropionic acid unit, preferably at least two dimethylolpropionic acid units.

Thus, it can be provided according to the invention that (a) the polyol has, or preferably consists of, units derived from bisphenol A and dimethylolpropionic acid.

According to one embodiment that is particularly preferred according to the invention, it can moreover be provided that (a) the polyol has the following formula:

This is because the applicant has found out, in a completely surprising manner, that the use of a specific polyol of this type has a particularly positive effect on the desired properties of the composition according to the invention with regard to the fixing of blanks for spectacle glasses. For example, the use of the specific polyol not only improves the rheological properties, but also the stickiness, which can be attributed in particular to the large number and specific arrangement of hydroxyl groups in the molecule—without wishing to be limited to this theory.

The text below will now discuss the second component of the mixture used for the composition according to the invention, namely the at least one organic polyester:

With regard to the organic polyester, the composition according to the invention should comprise the (b) organic polyester in amounts of from 50 to 95% by weight, in particular 55 to 90% by weight, preferably 60 to 80% by weight, preferably 65 to 75% by weight, based on the composition.

Moreover, it is particularly advantageous if the composition according to the invention comprises (a) the polyol and (b) the organic polyester in a weight-based quantitative ratio of (a) to (b) of 1:≥3, in particular 1:≥2.5, preferably 1:≥2, and/or if the composition comprises (a) the polyol and (b) the organic polyester in a weight-based quantitative ratio of (a) to (b) in the range from 5:1 to 1:10, in particular 3:1 to 1:8, preferably 1:1 to 1:5, particularly preferably 1:1 to 1:3, very particularly preferably 1:2 to 1:2.5. According to a particular embodiment of the present invention, the combination of (a) and (b) is added in a weight-based quantitative ratio of (a) to (b) of about 1:2.3.

Within the context of the present invention, it is advantageous if (b) the polyester is selected from modified polyesters, in particular from copolyesters. Equally, it is advantageous if (b) the polyester is selected from saturated polyesters. In this connection, (b) the polyester can be selected from saturated modified polyesters, in particular saturated copolyesters. In particular, (b) the polyester can be selected from in particular linear copolyesters with preferably primary hydroxyl functionalities.

Furthermore, as far as the polyester is concerned, it is within the scope of the present invention if (b) the polyester is an amorphous polyester, in particular an amorphous copolyester.

Moreover, it is within the scope of the present invention if (b) the polyester is a partially crystalline or crystalline, preferably a partially crystalline polyester, in particular a partially crystalline or crystalline, preferably a partially crystalline polyester. In this connection, it is advantageous if the crystalline polyester or the crystalline copolyester has a degree of crystallization of at least 10%, in particular at least 15%, preferably at least 20%, preferably at least 25%.

As explained in detail below, within the context of one embodiment that is particularly preferred according to the invention, it can be provided that the polyester component comprises at least two polyesters or copolyesters different

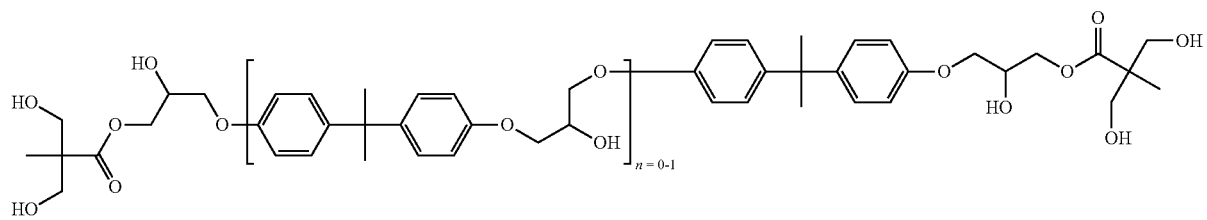

from one another, in particular where one of the polyesters or copolyesters used has an amorphous structure, and the other polyester or copolyester has a partially crystalline or crystalline structure.

In general, within the context of the present invention, (b) the polyester should have a molecular weight in the range from 1000 to 15 000 Da, in particular 1250 to 12 000 Da, preferably 1500 to 10 000 Da, preferably 1750 to 9000 Da. For example, the molecular weight can also be calculated or ascertained on the basis of the corresponding hydroxyl number, which is well-known per se to the person skilled in the art.

According to the invention, (b) the polyester should have a hydroxyl number in the range from 1 to 80 mg KOH/g, in particular 2 to 70 mg KOH/g, preferably 5 to 65 mg KOH/g, preferably 10 to 60 mg KOH/g. In this regard, the determination of the hydroxyl number can take place, for example, on the basis of DIN 53240 or DIN 53240-2.

Moreover, it can be provided according to the invention that (b) the polyester has an acid number in the range from 1 to 15 mg KOH/g, in particular 1 to 14 mg KOH/g, preferably 1 to 13 mg KOH/g, preferably 1 to 12 mg KOH/g, and/or that (b) the polyester has an acid number of at most 15 mg KOH/g, in particular at most 14 mg KOH/g, preferably at most 13 mg KOH/g, preferably at most 12 mg KOH/g.

Moreover, (b) the polyester should have a ring and ball softening point in the range from 40 to 90° C., in particular 45 to 85° C., preferably 50 to 80° C. In this connection, the softening point can be determined e.g. on the basis of DIN ISO 4625.

Equally, it can be provided according to the invention that (b) the polyester has a glass transition temperature in the range from −70 to 40° C., in particular −60 to 30° C.

Furthermore, (b) the polyester should have a melting range or a melting temperature in the range from 30 to 80° C., in particular 40 to 70° C., preferably 45 to 65° C., preferably 50 to 60° C.

As explained above, the melting range or the melting temperature and also the glass transition temperature described above can be determined using differential calorimetric measurement methods which are well-known per se to the person skilled in the art.

Furthermore, (b) the polyester, measured at a temperature of 130° C., should have a dynamic viscosity in the range from 100 to 50 000 mPa·s, in particular 150 to 30 000 mPa·s, preferably 200 to 25 000 mPa·s, preferably 500 to 15 000 mPa·s, particularly preferably 1000 to 12 000 mPa·s, very particularly preferably 1500 to 10 000 mPa·s. In addition, (b) the polyester can have a Brookfield viscosity of from 80 to 50 000 mPa·s, in particular 100 to 30 000 mPa·s, preferably 150 to 25 000 mPa·s, preferably 200 to 15 000 mPa·s, particularly preferably 500 to 11 000 mPa·s, very particularly preferably 1000 to 10 000 mPa·s, at a temperature of 80° C. The determination can take place for example by reference to DIN EN ISO 3219.

Finally, with regard to the polyester component, it can be provided that (b) the polyester has a density p, determined at a temperature of 23° C., in the range from 0.8 to 1.4 g/cm$^3$, in particular 0.9 to 1.3 g/cm$^3$, preferably 1 to 1.3 g/cm$^3$. The determination can take place for example on the basis of DIN 51757.

As explained above, in accordance with one embodiment that is particularly preferred according to the invention, it can be provided that the blocking agent composition according to the invention is conceived such that (b) the polyester or the polyester component of the composition according to the invention comprises at least two polyesters (b1) and (b2) different from one another. On the basis of this conception according to the invention, this is because it has been possible, in a completely surprising manner, to further improve the application properties of the composition according to the invention for the fixing of plastics material-based spectacle glass blanks, for example with regard to flow properties, melt properties, and also with regard to the adhesive behavior.

In this connection, it can be provided according to the invention that the at least two polyesters (b1) and (b2) different from one another differ from one another in at least one parameter, in particular selected from the group of molecular weight, hydroxyl number, acid number, softening point, glass transition temperature, melting range or melting temperature, dynamic viscosity and density. As regards the underlying value ranges, reference can be made to the above statements relating to the corresponding parameters which, in this regard, apply accordingly with the proviso that the polyesters used according to the invention differ in terms of value in at least one parameter, thus in this regard have different numerical values.

In this connection, it is advantageous according to the invention if the at least two polyesters (b1) and (b2) different from one another deviate from one another in the parameter differentiating them by at least 2%, in particular at least 5%, preferably at least 10%, preferably at least 15%, based on the numerically smaller value of the parameter differentiating the polyesters (b1) and (b2). The proviso stated above with regard to the different formation of respective parameters can be described in a nonlimiting manner and merely by way of example on the basis of the molecular weight: if, for example, (b1) the first polyester has a molecular weight of 2000 Da, it is advantageous within the context of the present invention if (b2) the second polyester has a molecular weight which deviates from this by at least 2%, in particular at least 5%, preferably at least 10%, preferably at least 15%. In the specific case, this means that (b2) the second polyester, with the prerequisite that (b1) the first polyester has a molecular weight of 2000 Da, has a corresponding molecular weight of at least 2040 Da, in particular at least 2100 Da, preferably at least 2200 Da, preferably at least 2300 Da.

According to one embodiment, it can be provided that (b1) the first polyester and (b2) the second polyester differ in their crystallinity.

In this connection, it may be provided that (b1) the first polyester is an amorphous polyester, in particular an amorphous copolyester, or a partially crystalline polyester, in particular a partially crystalline copolyester, and/or that (b2) the second polyester is a partially crystalline or crystalline, preferably a partially crystalline polyester, in particular a partially crystalline or crystalline, preferably a partially crystalline copolyester. If both (b1) and also (b2) have a partially crystalline or crystalline structure, the degrees of crystallinity of (b1) and (b2) can differ in particular by at least 2%, preferably by at least 5%, particularly preferably by at least 10%.

In particular, it is also preferred according to the invention if an amorphous polyester is combined with a partially crystalline polyester: thus, according to the invention, it can be provided that (b1) the first polyester is an amorphous polyester, in particular an amorphous copolyester. In this connection, (b2) the second polyester can be a partially crystalline or crystalline, preferably a partially crystalline, polyester, in particular a partially crystalline or crystalline, preferably a partially crystalline, copolyester. In this connection, the degree of crystallinity of (b2) the second polyester should be at least 10%, in particular at least 15%, preferably at least 20%, preferably at least 25%.

Moreover, according to the invention, it can be provided that (b1) the first polyester is a partially crystalline polyester, in particular a partially crystalline copolyester. This is because, in this connection as well, good results are obtained with regard to the blocking agent compositions according to the invention. In this regard, the degree of crystallinity of (b1) the first polyester should be at least 10%, in particular at least 15%, preferably at least 20%, preferably at least 25%. In this connection, it can thus be provided according to the invention that (b1) the first polyester has a partially crystalline fraction and/or is partially crystalline, where, for this case, it can moreover be provided that the degree of crystallinity of (b1) the first polyester is preferably lower than the degree of crystallinity of (b2) the second polyester. Finally, the use of a crystalline polyester or copolyester is also contemplated for (b1).

As far as the first polyester component is concerned, the composition according to the invention should comprise (b1) the first polyester in amounts of from 1 to 70% by weight, in particular 1 to 60% by weight, preferably 1 to 50% by weight, preferably 2 to 40% by weight, particularly preferably 5 to 35% by weight, very particularly preferably 10 to 30% by weight, even further preferably about 20% by weight, based on the composition.

As far as the second polyester component is concerned, the composition according to the invention should comprise (b2) the second polyester in amounts of from 5 to 70% by weight, in particular 10 to 70% by weight, preferably 20 to 70% by weight, preferably 30 to 70% by weight, particularly preferably 35 to 65% by weight, very particularly preferably 40 to 60% by weight, even further preferably about 50% by weight, based on the composition.

In this connection, it is advantageous if the composition comprises (a) the polyol in an amount of about 30% by weight, if the first polyester component (b1) is used in an amount of about 20% by weight and the second polyester component (b2) is used in an amount of about 50% by weight.

Within the context of the use as blocking agent composition, it has proven to be particularly advantageous to organize the quantitative ratio between the first polyester component (b1) and the second polyester component (b2) to correspond to the proviso below: thus, it is advantageous if the composition according to the invention comprises (b1) the first polyester and (b2) the second polyester in a weight-based quantitative ratio of [(b1):b2)] or of [(b2):(b1)] in the range from 2:1 to 1:8, in particular 1.5:1 to 1:7, preferably 1:1 to 1:6, preferably 1:1 to 1:4, particularly preferably 1:1 to 1:3, very particularly preferably about 1:2.5.

According to the invention, the quantitative ratio with regard to (a) the polyol component also plays an important role: thus, within the context of the present invention, it can be provided that the composition according to the invention comprises (a) the polyol, (b1) the first polyester and (b2) the second polyester in a weight-based quantitative ratio of [(a):(b1):(b2)] or of [(a):(b2):(b1)] in the range from about [0.2 to 6]:[0.1 to 5]:[0.3 to 15], in particular [0.5 to 3]:[0.3 to 2]:[0.8 to 8], preferably about 1.5:1:2.5.

As far as the at least two polyesters different from one another are concerned, (b1) the first polyester should have a molecular weight in the range from 1500 to 2500 Da, in particular 1800 to 2300 Da, preferably of about 2000 Da, and/or (b2) the second polyester should have a molecular weight in the range from 3000 to 4000 Da, in particular 3300 to 3800 Da, preferably of about 3500 Da.

In this connection, moreover, (b1) the first polyester should have a hydroxyl number in the range from 45 to 65 mg KOH/g, in particular 50 to 60 mg KOH/g, and/or (b2) the second polyester should have a hydroxyl number in the range from 20 to 40 mg KOH/g, in particular 27 to 34 mg KOH/g.

Within the context of the present invention, it is also advantageous if (b1) the first polyester has an acid number in the range from 5 to 15 mg KOH/g, in particular 6 to 14 mg KOH/g, preferably 8 to 12 mg KOH/g, and/or if (b1) the first polyester has an acid number of at most 15 mg KOH/g, in particular at most 14 mg KOH/g, preferably at most 12 mg KOH/g, and/or if (b2) the second polyester has an acid number in the range from 1 to 4 mg KOH/g, in particular 1 to 3 mg KOH/g, preferably 1 to 2 mg KOH/g, and/or if (b2) the second polyester has an acid number of at most 4 mg KOH/g, in particular at most 3 mg KOH/g, preferably at most 2 mg KOH/g.

Furthermore, as far as the first polyester component on the one hand and the second polyester component in the composition according to the invention are concerned, (b1) the first polyester can have a ring and ball softening point in the range from 45 to 55° C., in particular 50 to 54° C., preferably of about 53° C., and/or (b2) the second polyester can have a ring and ball softening point in the range from 58 to 70° C., in particular 60 to 65° C., preferably of about 63° C.

The (b1) first polyester can have a glass transition temperature in the range from 0 to 20° C., in particular to 15° C., preferably of about 10° C. In this connection, (b2) the second polyester should have a glass transition temperature in the range from −70 to −50° C., in particular −65 to −55° C., preferably of about −60° C.

According to one embodiment preferred according to the invention, it can be provided that (b2) the second polyester, in particular different from the first polyester (b1), has a melting range or a melting temperature in the range from 45 to 65° C., in particular 50 to 60° C., preferably of about 55° C.

Within the context of the present invention, particularly good results are obtained if (b1) the first polyester and (b2) the second polyester have viscosities, in particular dynamic viscosities, that are different from one another.

In this connection, according to the invention, it can be provided that the viscosities, in particular the dynamic viscosities, above the melting range and/or glass transition range, in particular in a temperature range from 80° C. to 130° C., differ from one another by at least 100 mPa·s, in particular by at least 500 mPa·s, preferably by at least 1000 mPa·s, preferably by at least 5000 mPa·s, particularly preferably by at least 10 000 mPa·s.

Equally, according to the invention, it can be provided that the viscosities, in particular the dynamic viscosities, above the melting range and/or glass transition range, in particular in a temperature range from 80° C. to 130° C., differ from one another in a range from 100 to 10 000 mPa·s, in particular 200 to 8000 mPa·s, preferably 500 to 6000 mPa·s, preferably 1000 to 5000 mPa·s.

Furthermore, it is possible according to the invention that the first polyester above the melting range and/or the glass transition range, in particular in a temperature range from 80° C. to 130° C., has a lower viscosity, in particular a lower dynamic viscosity, than (b2) the second polyester.

Thus, within the context of the invention, it can be provided that (b1) the first polyester above the melting range and/or glass transition range, in particular in a temperature range from 80° C. to 130° C., has a viscosity, in particular dynamic viscosity, in a range from 100 to 10 000 mPa·s, in particular 200 to 8000 mPa·s, preferably 500 to 5000 mPa·s.

Moreover, according to the invention, it can be provided that (b2) the second polyester above the melting range and/or glass transition range, in particular in a temperature range from 80° C. to 130° C., has a viscosity, in particular dynamic viscosity, in a range from 1000 to 50 000 mPa·s, in particular 2000 to 30 000 mPa·s, preferably 5000 to 25 000 mPa·s.

Furthermore, (b1) the first polyester, measured at a temperature of 130° C., can have a dynamic viscosity in the range from 500 to 2000 mPa·s, in particular 750 to 1500 mPa·s, preferably of about 1000 mPa·s. In this connection, (b2) the second polyester, measured at a temperature of 80° C., should have a dynamic viscosity in the range from 1500 to 2500 mPa·s, in particular 1750 to 2200 mPa·s, preferably of about 2000 mPa·s.

Finally, with regard to the first polyester component and the second polyester component in a specific matching to one another, it can be provided that (b1) the first polyester has a density p, determined at a temperature of 23° C., in the range from 1.04 to 1.12 g/cm$^3$, in particular 1.06 to 1.1 g/cm$^3$, preferably from about 1.08 g/cm$^3$, and/or that (b2) the second polyester has a density p, determined at a temperature of 23° C., in the range from 1.12 to 1.2 g/cm$^3$, in particular 1.14 to 1.18 g/cm$^3$, preferably of about 1.16 g/cm$^3$.

On the basis of the purpose-oriented and specific matching of the at least two polyester components (b1) and (b2) different from one another in the composition according to the invention, particularly also with regard to the polyol component (a), the properties of the composition according to the invention can be yet further improved.

As detailed above, the present invention is not limited to the use of the polyester components (b1) and/or (b2) described above; rather, it is also possible to use further polyester components (b3), (b4), (b5) of the composition according to the invention with different parameters in accordance with the above proviso.

For example, the composition according to the invention can, optionally in combination with the above polyesters, have a specific polyester component (b3) which, measured at 23° C., has a density of about 1.16 g/cm$^3$, a viscosity at 80° C. of about 15 000 mPa·s, a molecular weight of about 8500 Da, a total acid number of at most 2, a melting point of about 57° C., a softening point of about 65° C. and a glass transition temperature of about −60° C., and also a hydroxyl number of about 10 to 16 mg KOH/g. Such a polyester component (b3) can be used for example in amounts of from 5 to 30% by weight, based on the composition.

Equally, the composition can comprise a specific polyester component (b4) which has a density of about 1.16 g/cm$^3$, measured at 23° C., a viscosity, measured at 80° C., of about 10 000 mPa·s, a molecular weight of about 6500 Da, a melting point of about 57° C., a softening point of about 63° C. and a glass transition temperature of about −60° C., and also a hydroxyl number of about 14 to 20 mg KOH/g. A polyester component (b4) of this type can be used for example in amounts of 5 to 30% by weight, based on the composition.

Moreover, the composition according to the invention can have a specific polyester component (b5) which has a density, measured at 23° C., of about 1.23 g/cm$^3$, a viscosity, measured at 130° C., of about 10 000 mPa·s, a molecular weight of about 3000 Da, a total acid number of at most 2, a softening point of about 76° C., a glass transition temperature of about 30° C., and a hydroxyl number of about 31 to 39. Such a polyester component (b5) can be used in amounts of from 5 to 40% by weight, based on the composition.

In a nonlimiting manner, e.g. a combination of component (a) with (b2) and (b3), a combination of (a) with (b2) and (b5) and/or (b3) can be realized.

Furthermore, the composition according to the invention can also comprise at least one polyester polyol, in particular with an acid number of at most 0.6 and in particular in amounts of from 1 to 15% by weight, based on the composition.

Furthermore, the composition according to the invention can optionally moreover comprise at least one wax, in particular where the wax comprises a mixture of esters, wax acids and alcohols, in particular in amounts of from 1 to 50% by weight, in particular 5 to 45% by weight, preferably 10 to 40% by weight, based on the composition.

In this connection, the wax should have a melting range or a melting temperature in the range from 50 to 120° C., in particular 55 to 110° C., preferably 60 to 100° C., preferably 70 to 95° C.

Finally, the composition according to the invention can moreover comprise at least one further ingredient and/or at least one additive and/or at least one refining agent, in particular selected from the group of aging inhibitors, preservatives, antioxidants, stabilizers, fillers, in particular inorganic particles, rheology modifiers, dispersants, wetting agents, heat transfer agents, plasticizers, adhesion promoters, extenders, solvents, solubility promoters, antifoams, emulsifiers, crystallization accelerators and substances for preventing hydrolysis and/or water absorption, in particular in amounts of in each case 0.001 to 60% by weight, in particular 0.01 to 40% by weight, preferably 0.1 to 10% by weight, based on the composition.

The present invention further provides—according to a second aspect of the present invention—a method for fixing blanks for ophthalmic and/or optical lenses, preferably of plastics material-based spectacle glass blanks, where
(a) firstly the blank is arranged above or laterally to a carrier, in particular a block piece, in such a way that the side and/or surface of the blank to be processed faces away from the carrier and in such a way that a fillable cavity results between the carrier on the one hand and the blank on the other hand, optionally with use of at least one sealing means;
(b) then the cavity is at least essentially completely filled with a composition, as defined above, which is liquefied and/or converted to a flowable state preferably by heating; and
(c) then the composition is cured and/or solidified, preferably by cooling, to give a composite having the carrier with the blank fixed thereon by means of the composition.

Within the context of the method according to the invention, it can be provided that the side to be fixed or the section of the blank to be fixed is additionally equipped with a protective film or adhesive film which is then accordingly bonded with the adhesive mass. As a result of this, the blank can be yet further protected. The procedure in this respect is known in detail to the person skilled in the art, meaning that no further statements are required in this respect. In general, the blank can be adhered with regard to the side to be adhered over the whole surface or in sections, preferably in sections.

As far as the carrier or the block is concerned, this can generally be configured in one or more parts.

A suitable sealing means is, for example, a sealing limit, such as a blocking ring. The sealing means here can also be configured such that at least sections of the sealing means encompass the spectacle glass blank and/or the block at the sides and/or project at the sides beyond the edge of the blank and/or block.

Within the context of the method according to the invention, the procedure can also be such that the carrier or the blank is firstly provided with the adhesive or the blocking agent composition and the adhesive is applied to the carrier for curing, in particular using a sealing agent, such as a blocking ring or the like, for forming a fillable volume. An at least partial melting or incipient melting of the adhesive can then take place, during which the blank to be fixed the carrier can then be placed onto the molten or incipiently molten adhesive mass.

Moreover, according to the invention, the procedure may also involve introducing or pouring the adhesive in the non-molten and/or in the solid or cured state into the cavity or into the volume to be filled. In this connection, the adhesive can be used for example in the form of pellets and/or moldings adapted in terms of size to the cavity. In the volume thus filled, the adhesive or the blocking agent composition can then be converted to a liquefied and/or to a flowable state, especially with heating. In this connection—particularly in order to ensure, or to improve, the filling of the cavity or of the volume to be filled—it can be provided that the blank and/or the carrier is arranged or positioned only after the filling and/or optionally only after the melting.

The present invention equally relates to—according to a third aspect of the present invention—a composite having at least one carrier, in particular a block piece, and also a blank, fixed to the carrier, for ophthalmic and/or optical lenses, preferably a plastics material-based spectacle glass blank, where the blank is fixed to the carrier with a composition as defined above.

Equally, the present invention provides—according to a fourth aspect of the present invention—a method for producing an ophthalmic and/or optical lens, preferably a plastics material-based spectacle glass, where
(a) firstly a blank for ophthalmic and/or optical lenses, preferably a plastics material-based spectacle glass blank, is arranged above or laterally to a carrier, in particular a block piece, in such a way that the side and/or surface of the blank to be processed faces away from the carrier, and in such a way that a fillable cavity results between the carrier on the one hand and the blank on the other hand, optionally with use of at least one sealing means;
(b) then the cavity is at least essentially completely filled with a composition, as defined above, which is liquefied and/or converted to a flowable state, preferably by heating;
(c) then the composition is cured and/or solidified, preferably by cooling, to give a composite having the carrier with the blank fixed thereon by means of the composition; and
(d) finally a processing of the blank fixed on the carrier, in particular by means of machining, milling, grinding, polishing or the like, takes place and, in this way, the ophthalmic and/or optical lens, preferably the plastics material-based spectacle glass, is obtained.

The procedure in this regard is also well-known per se to the person skilled in the art, meaning that no further statements are required in this respect. Moreover, reference can be made in particular also to the details relating to the method according to the second aspect of the present invention, which apply here accordingly.

In general, yet further method steps can follow method step (d). For example, the ophthalmic and/or optical lens obtained in step (d), preferably the plastics material-based spectacle glass, can also be imprinted, coated, embossed, dyed, marked, engraved or the like in the manner known per se to the person skilled in the art. For example, an engraving or marking can be carried out by means of laser treatment.

Furthermore, the present invention relates—according to a fifth aspect of the present invention, to an ophthalmic or optical lens, preferably a plastics material-based spectacle glass or a plastics material glass which is obtainable by the method according to the fourth aspect of the present invention. The lens according to the invention or the spectacle glass according to the invention is characterized in that, on account of the excellent adhesion to the carrier with slight deformation of the adhesive upon the application of force, it has an exceptionally high surface quality and thus excellent optical properties since it can be processed particularly evenly and with high precision. In particular, the spectacle glass according to the invention produced using the method according to the invention has a high surface quality and optical quality with only very slight deviations and/or irregularities in the processed surface.

Furthermore, the present invention relates—according to a sixth aspect of the present invention—to the use of the composition according to the invention, in particular blocking agent composition, as defined above, in the production of ophthalmic and/or optical lenses, preferably of plastics material-based spectacle glasses.

Finally, the present invention relates—according to a seventh aspect of the present invention—to the use of the composition according to the invention, in particular the blocking agent composition, as defined above, for processing blanks for ophthalmic and/or optical lenses, preferably plastics material-based spectacle glass blanks, and/or for producing ophthalmic and/or optical lenses, preferably plastics material-based spectacle glasses, for fixing the blank to a carrier, in particular a block piece.

Further embodiments, modifications and variations of the present invention are directly evident and realizable for the person skilled in the art upon reading the description without, in so doing, departing from the scope of the present invention.

WORKING EXAMPLES

Compositions according to the invention and compositions of the prior art are described below. The compositions can be prepared on the basis of methods that are well-known to the person skilled in the art, for example by mixing the starting substances in the course of a melt. Hereinbelow, the abbreviation "pts. by wt." refers to parts by weight.

1. Compositions According to the Invention a) To prepare compositions A according to the invention in the form of blocking agent compositions, mixtures are produced which contain, on the one hand, linear partially crystalline polyesters and, on the other hand, a hydroxy- and carboxy-functional polyol. In this connection, to provide the compositions A according to the invention, in each case mixtures with mixing ratios of polyester on the one hand to polyol on the other hand in the range from 80 pts. by wt. to 20 pts. by wt. to 20 pts. by wt. to 80 pts. by wt. are prepared. The processing temperature of the compositions obtained is 70° C. or 75° C.

In particular, a positive influence of the amorphous fraction in the composition on the basis of the amorphous polyol or on the basis of the amorphous fraction of the partially crystalline polyester with a high modulus of elasticity overall on the haptics can be observed at room temperature. In particular, the processing properties and the haptics of the compositions A according to the invention are positively influenced by the polyols used according to the invention. The haptics is not, or at most only slightly, wax-like, with the compositions A according to the invention after curing being at most only slightly sticky. In the underlying experimental series virtually no cracks are evident after curing.

In further formulations based on the compositions A, the corresponding compositions are equipped with 25 to 40 parts by weight of filler, especially where the filler fraction replaces the corresponding fraction of polyol component. In particular, 60 parts by weight of the alcohol are replaced by a filler. The compositions equipped in this way have an again reduced crack formation.

ba) Particularly on account of the surprisingly found positive influence on the processing properties and the haptics of the polyol used under a) on the processing properties and the haptics, this is retained in the following formulations and again mixed with different linear partially crystalline polyesters. As regards the polyesters used, melt viscosities of from 500 to 5000 mPa·s are chosen for the first polyester [polyester I or polyester component (b1)] and melt viscosities of from 5000 to 25 000 mPa·s are chosen for the second polyester [polyester II or polyester component (b2)] to give compositions B1 according to the invention.

(i) In an experimental series for preparing compositions B1 according to the invention, different formulations are prepared which have the polyesters listed above in each case in a ratio [polyester I or polyester component (b1)] to [polyester II or polyester component (b2)] to [polyol] in the range from [30 to 50 pts. by wt.] to [20 to 40 pts. by wt.] to [20 to 40 pts. by wt.]. In this connection, the low-melting polyester is thus added in deficit, and the polyol fraction in the composition according to the invention is chosen to be high.

The haptics at room temperature are very good for all formulations and compositions according to the invention; all materials are solid and exhibit no wax-like behavior. The processability at temperatures in the range from 65° C. to 80° C. is already good, but sometimes still not quite optimal, which is connected in particular with the relatively low fraction of low molecular weight polyester. The crack formation of the solid or cured material at room temperature is good, which is connected in particular with the high amorphous fraction in the composition according to the invention.

(ii) In a second experimental series for preparing compositions B2 according to the invention, different formulations and compositions are investigated which have a ratio of [polyester I or polyester component (b1)] to [polyester II or polyester component (b2)] to [polyol] in the range from [40 to 60 pts. by wt.] to [10 to 30 pts. by wt.] to [20 to 40 pts. by wt.]. In the course of this experimental series, the low-melting polyester is thus added in excess, and the polyol fraction is chosen to be high.

The haptics at room temperature are very good for all formulations B2 according to the invention, all materials are solid and exhibit no wax-like behavior. The processability at temperatures in the range from 65° C. to 80° C. is again considerably improved for all formulations, which is attributed in particular to the high fraction of low molecular weight polyester. The crack formation of the solid or cured material at room temperature is very good, which is attributed in particular to the high amorphous fraction in the compositions B2 according to the invention. The measurements of the delays of the compositions B2 reveal only slight deviations in the micrometer range, and the material becomes solid after a cooling time of 10 to 90 s, and the material can moreover be further processed without problems after a curing time from 10 to 180 min.

(iii) In a third experimental series, different formulations and compositions B3 according to the invention are investigated which have a ratio of [polyester I or polyester component (b1)] to [polyester II or polyester component (b2)] to [polyol] in the range from [50 to 70 pts. by wt.] to [5 to 25 pts. by wt.] to [15 to 35 pts. by wt.]. The low-melting polyester is thus added in a large excess, and the polyol fraction ends up somewhat smaller.

The haptics at room temperature are very good for all formulations and compositions B3 according to the invention, all materials are solid and exhibit no wax-like behavior. The processability at temperatures of 65° C. to 80° C. is again further improved compared to the experimental series listed above, which lies in particular with the very high fraction of the low molecular weight polyester. The crack formation of the solid material at room temperature is slightly greater than in the case of the previous experiments, especially on account of the high partially crystalline fraction. Overall, however, the crack formation is still extremely slight.

bb) To prepare further compositions B4 according to the invention in the form of blocking agent compositions, mixtures are produced which have a first polyester I or (b1) and a second polyester II or (b2). The first polyester I or (b1) here is an amorphous copolyester with a dynamic viscosity, measured at 130° C., of about 1000 mPa·s. The second polyester II or (b2) is a partially crystalline or crystalline copolyester with a dynamic viscosity of about 2000 mPa·s, measured at a temperature of 80° C. Furthermore, the compositions B4 according to the invention have the hydroxy- and carboxy-functional polyol previously described under 1a). The compositions B4 have the listed substances in a ratio [polyester I or polyester component (b1)] to [polyester II or polyester component (b2)] to [polyol] in a range from [10 to 50 pts. by wt.] to [30 to 70 pts. by wt.] to [10 to 40 pts. by wt.].

Also in the case of the compositions B4 according to the invention, the haptics at room temperature are excellent, with no wax-like behavior being equally present. The processability at temperatures from 65° C. to 80° C. is equally good, and also the crack formation of the solid material at room temperature is slight. Furthermore, the compositions B4 have an exceptional stickiness. As a result, the compositions B4 according to the invention also meet the high requirements which are placed on a blocking agent composition.

In summary, it can ultimately be established that the compositions according to the invention have excellent properties with regard to their use as blocking agent composition for the fixing of blanks for ophthalmic or optical lenses, in particular on the basis of plastics material, where in particular the compositions B2 according to the invention with a ratio of [polyester I or polyester component (b1)] to [polyester II or polyester component (b2)] to [polyol] in the range from [40 to 60 pts. by wt.] to [10 to 30 pts. by wt.] to [20 to 40 pts. by wt.] have particularly exceptional properties. In particular, the compositions B2 according to the invention have extraordinarily good properties with regard to haptics, rigidity and avoidance of a wax-like behavior—and this with simultaneous very good processability at temperatures in the range from 65 to 80° C. and high cracking resistance of the cured material.

Overall, however, all compositions according to the invention have very good processing, in particular at temperatures of 50 to 80° C., and a high rigidity at room temperature. Moreover, the compositions according to the invention are characterized in that they are recyclable and/or have nontoxic materials, which is advantageous especially with regard to disposal costs.

Furthermore, all compositions according to the invention have exceptional stickiness, where, during curing, moreover at most only slight delays occur and no excessive tendency to form shrinkage cracks is observed. A trouble-free deblocking of the lens from the carrier is also possible.

2. Comparative Examples c) Testing of pure substances

Amorphous and partially crystalline pure substances are investigated below with regard to their suitability as blocking agent composition for the fixing of spectacle glass blanks. The corresponding pure substances are examined in particular also with regard to the requirement profile as is satisfied on the part of the compositions according to the invention, in particular with regard to the processability and/or process capability at temperatures in the range from 50° C. to 80° C., the rigidity of the compositions at room temperature, the insolubility in water of the compositions in the solid state, and also the toxicity behavior and the possibility of re-use.

The prior art compositions C investigated in this respect and based on polymerized amorphous or partially crystalline plastics materials or pure substances are prepared on the basis of commercially available pure substances, with the following substances being contemplated in this regard: 1,2,3-trimethoxybenzene; 1,8-octanediol; 1-hexadecanol; 2-aminobenzonitrile; benzoic anhydride; cyclododecane; cyclo-dodecanone; cyclohexyl phenyl ketone; deoxybenzoin; hydroquinone dimethyl ether; paraffin 51-53; paraffin 57-60; paraffin 58-62; pentadecanone; pentadecanoic acid; phenyl salicylate; span 65; stearyl alcohol, tetracosane and tetradecanoic acid. In particular, the wax-like amorphous paraffin 58-62 as flexible polymer and hydroquinone dimethyl ether as brittle organic partially crystalline compound are tested.

Hydroquinone dimethyl ether has, at 50° C., an at most satisfactory processing viscosity. At room temperature, this substance is hard and brittle. The adhesive strength is inadequate, in particular with regard to a block piece. Although the investigated paraffin 58-62 exhibits a slightly improved adhesive strength and, moreover, is processed relatively easily at temperatures of 60° C., paraffin 58-62 at room temperature has considerably too low an internal rigidity in order to be fixed durably and securely to a block piece. The further investigated pure substances ultimately have no optimal properties which could lead to a suitability in this regard as blocking agent composition. This experimental complex ultimately shows that pure substances as such can in no way cover the complete spectrum of requirements for a blocking agent material.

d) Commercially available adhesive cements with and without fillers

Furthermore, commercially available adhesive cements are investigated, where, in this connection, the most important selection criteria are the processing temperature, the adhesion and the stated hardness at room temperature. In particular, adhesive cements based on colophony, shellac, wax crude cements or adhesives made of synthetically produced synthetic resins are investigated:

(i) Firstly, synthetic adhesives based on maleic and formaldehyde are investigated. Although these exhibit satisfactory adhesive properties both to a block piece and also to a block film or a protective film or adhesive film of a spectacle glass blank, noninventive compositions of this type have a low internal rigidity and excessively high processing temperatures.

(ii) Furthermore, various types of synthetic resin based on maleic and formaldehyde are investigated which contain a high filler fraction. In contrast to the synthetic resins specified under d(i), these types of synthetic resins have a higher internal rigidity at room temperature. However, the other relevant properties are unsatisfactory.

(iii) Furthermore, adhesive cements based on natural and synthetic waxes are investigated. These have a very low melting temperature and thus a relatively good processing viscosity. The adhesive properties to a block film or a protective film or adhesive film, on the one hand, and a block piece, on the other hand, are moderate to satisfactory. The hardness and internal rigidity of the materials at room temperature is, with a value of 28, too low, meaning that substances of this type are not suitable as blocking agent.

(iv) In a next investigation complex, adhesive cements based on shellac or colophony with natural plasticizers are investigated, taking into consideration a low processing temperature. In this regard, although satisfactory adhesive properties to a block piece and to a block film or a protective film or adhesive film are evident, the adhesive cements under discussion, however, have an only inadequate rigidity, with a value of 30.

The compositions described under d(i) to d(iv) have, moreover, the serious disadvantage that these adhesive cements have very strong adhesion to the machine components, which has an adverse effect during processing (v) Experiments with adhesive cements based on thermoplastic caprolactams with a softening point between 58° C. and 60° C. and also with polyols with a similar softening range are subsequently carried out. Although the investigated caprolactams lead to good adhesive properties to a block piece and to a block film or a protective film or adhesive film and also have satisfactory internal rigidities at room temperature, the other properties are unsatisfactory with regard to a suitability as blocking agent composition. Moreover, the investigated polyols have a significantly lower adhesive strength and, moreover, are fingernail-soft at room temperature.

(vi) Similarly, adhesive cements based on colophony derivatives, maleic resins, plasticizers and additionally 40 pts. by wt. of fillers are investigated. Here, it is found that the particular combination better satisfies the required properties for a blocking agent composition than the aforementioned compositions since both the adhesion to a block piece and also to a block film or a protective film or adhesive film are fundamentally present. Moreover, the inner rigidity at room temperature is relatively high as a result of adding fillers, with the material being water-resistant and having a relatively low shrinkage upon solidification. However, a disadvantage is the high processing temperature, which is significantly above 80° C.

(vii) Abietic acid (constituent of colophony) can be described by the chemical structural formula below:

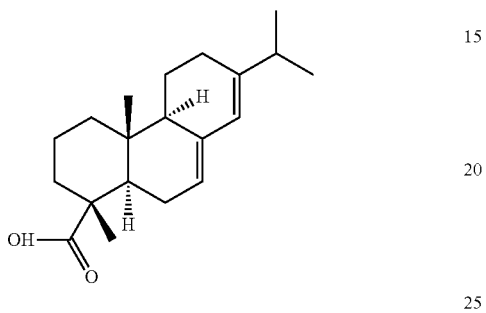

On the basis of this formulation, investigations are undertaken in a targeted manner with which the properties, described in particular under d(vi), of adhesive cements based on colophony are to be retained, where, in this connection, in particular the melt viscosity and the processing temperature connected therewith are to be reduced.

The investigations carried out in this connection, however, cannot lead to an improvement in the corresponding properties, meaning that ultimately also compositions based on colophony are not suitable with regard to a specific use as blocking agent composition.

In summary, it can be established that although the adhesive cements described under d) have a sometimes relatively good adhesive strength, the inner rigidity is in no way sufficient to avoid shape deviations in the glass processing steps that follow the blocking. The softening temperatures and the processability directly connected therewith are, for most of the tested adhesive cements, significantly outside of the range realized in accordance with the invention. Although the formulations based on adhesive cements listed as per d) have a certain improvement in the properties compared to the pure substances tested under c), this is unable to lead to a suitability of the described compositions in the sense of a use as blocking agent.

e) Further investigations on prior art compositions

On the basis of the above properties of the adhesive cement formulation made of colophony derivatives, various maleic resins, plasticizers and on the basis of using fillers, further formulations are prepared from these basic components and investigated as to their suitability as blocking agent or blocking agent composition for the working process of plastic glasses and plastic lenses.

The experiments performed start in accordance with the formulation of the adhesive cements based on colophony derivatives, maleic resins, plasticizers and additional fillers, which are added in an amount of 40 pts. by wt. Even a further modification of the compositions does not lead to the negative properties of these compositions, as listed above, being overcome or compensated for.

(i) Firstly, purely amorphous formulations are tested, in particular since these have an only slight crack formation. In this connection, different colophony derivatives with different softening points are mixed which additionally differ significantly in their hardness. A first resin here has a softening temperature in the region of room temperature and is relatively soft; a second resin has a softening temperature of 65° C. and is very hard.

For all mixtures with a ratio of the first resin to the second resin in the range from 80 to 20 pts. by wt. to 20 to 80 pts. by wt., no cracks arise. The adhesion to a block piece and to different block films and/or protective films or adhesive films is satisfactory. The processing temperature can be reduced compared with pure binders made from colophony, as described above, from 115° C. to 60° C. in the case of the mixture with the lowest adhesive fraction. In general, however, the properties are not satisfactory with regard to a suitability as blocking agent composition. This is because it is equally evident that although colophony-based amorphous systems have relatively good adhesive and adhesion properties, they have excessively high processing temperatures.

(ii) Even an admixing of partially crystalline polyester with melt viscosities of from 1000 mPa·s to 15 000 mPa·s cannot lead to an improvement in the properties of colophony-based compositions. Thus, mixtures with a ratio of polyester to colophony of 80 to 20 pts. by wt. to 20 to 80 pts. by wt. are investigated. Although the processing viscosities and the melting temperature can be adjusted to a fixed melting point coupled with overall satisfactory adhesion properties, severe cracks are evident, which can be connected in particular with the high partially crystalline fraction of the polyester.

(iii) In a further experimental complex, furthermore 40 pts. by wt. of the filler kaolin are added to the compositions as per e(ii) in order, as a result of this, to attempt to minimize the crystallization shrinkage and the crack development associated therewith. The mixtures have a ratio of partially crystalline polyester to colophony derivative in the range from 80 to 20 pts. by wt. to 20 to 80 pts. by wt. Similarly, polyesters with melt viscosities of from 1000 mPa·s to 15 000 mPa·s are again used.

It is evident that with the filler the processing viscosities increase considerably and not all formulations are processable. Moreover, an increased amorphous colophony fraction displays a detachment of the composition from a block piece. The crack formation is somewhat reduced, but still high.

(iv) For further investigations, formulations are used in which the ratio of partially crystalline polyester to colophony is in the range from 80 to 20 pts. by wt. to 20 to 80 pts. by wt. Various fillers with a lower oil number than kaolin are added in an amount of 40 pts. by wt., so that the resulting compositions have better wetting properties and a less considerable increase in viscosity, which is intended to avoid the crack formation. In this experimental complex, two fillers based on SiO$_2$ with an oil number of 17 to 11 are investigated. Moreover, two fillers based on BaSO$_4$ are investigated.

Although the formulations have a reduced crack formation, the processing temperatures for all variants are significantly higher than 75° C., meaning that a pouring of the compositions investigated here is not possible.

(v) Further compositions are investigated, the aim here being to replace the partially crystalline polyester used above and having a melt viscosity of 1000 mPa·s to 5000 mPa·s by a polyester with a melt viscosity of 500 mPa·s to 1000 mPa·s. Moreover, the filler fraction is reduced from 40 pts. by wt. to 30 pts. by wt. By means of these measures, the aim was to reduce the processing viscosity. The compositions have a ratio of partially crystalline polyester to colophony in the range from 80 to 20 pts. by wt. to 20 to 80 pts. by wt. The fillers used are SiO$_2$, BaSO$_4$, and a variant with glass beads, which is characterized by viscosity-reducing properties.

Although these measures can achieve a satisfactory processing viscosity at 65° C., all of the formulations and compositions have a crack formation caused by high shrinkage, this being lowest for the compositions with the filler based on glass beads. However, even the results in this regard are unsatisfactory.

(vi) For the experiments described here, various formulations using a filler based on glass beads are investigated. The mixtures used comprise a low molecular weight partially crystalline polyester with a melt viscosity of mPa·s to 1000 mPa·s, and colophony, where the ratio in this regard of the partially crystalline polyester to colophony is in the range from 80 to 20 pts. by wt. to 20 to 80 pts. by wt. The compositions have the filler made of glass beads in an amount of from 20 to 50 pts. by wt. and moreover a viscosity-reducing wax in an amount of from 5 to 20 pts. by wt., which is intended to compensate for the increase in viscosity due to the filler fraction. However, this is not possible to a satisfactory degree. Moreover, although the shrinkage and the crack formation associated therewith is somewhat reduced, it is not completely suppressed.

(vii) In this experimental series, the amorphous resin fraction is increased to above 50 pts. by wt., with the aim of minimizing shrinkage. In this connection, different formulations are prepared which comprise a low-viscosity partially crystalline linear polyester and colophony in a ratio in this respect in the range from 50 to 80 pts. by wt. to 50 to 20 pts. by wt. In further formulations, instead of the polyester, a capralactone is used. Fillers are dispensed with completely.

In the case of these compositions, no cracks appear, and all of the compositions are relatively easy to process at a temperature of 65° C. The disadvantage, however, is the wax-like haptics and a high residual stickiness at room temperature. It is found that reducing the partially crystalline fraction from 70 pts. by wt. to below 50 pts. by wt. and blending with an amorphous polymer somewhat minimizes shrinkage and crack formation.

3. Further Comparative Examples

Melt adhesives used in the prior art which are used as blocking agents generally consist of a metal alloy with a low melting point. This material has a number of disadvantages, such as increased toxicity and high disposal costs. Compositions based on polymers as are known in the prior art can partly compensate for the disadvantages associated with metal alloys, although compositions of this type overall do not always have positive properties, meaning that these are generally not suitable as blocking agents.

Thus, e.g. compositions based on polycaprolactone do not satisfy the totality of the required properties to a satisfactory degree. The greatest problems which arise when using polycaprolactone are in particular a high viscosity, which hinders processing, and high material shrinkage, as a result of which cracks arise during curing and positioning errors of the lens or plastic glass to be processed are caused, such that overall the precision during processing—in particular during milling, turning, polishing or grinding—of the (plastic) lens is impaired. In this connection, especially during curing, excessive delays arise, meaning that ultimately also the optical quality of a lens blocked in this way is adversely affected, in particular since its exact positioning is worse overall. Furthermore, on account of the non-optimal pressure-sensitive adhesiveness, the compositions of the prior art have only limited options for complete under-blocking. Moreover, the compositions are problematic with regard to their toxicity, which also hinders their disposal. Although the viscosity and the material shrinkage can be influenced to a certain extent by varying the molecular weight, an improvement in one of these properties leads to a deterioration in the other property in each case.

In order to compensate for the disadvantages associated with the polycaprolactone used in the prior art, it has also been attempted in the prior art to mix compositions of this type with thermoplastic elastomers and/or to replace the polycaprolactones with other polymers. The polymers used in this regard have essentially a melting point in the desired range and cure relatively quickly in the pure state. Depending on the molecular weight of the polymers used, the viscosity of the melts and the material shrinkage also vary to a certain extent during curing, during which, in this connection, for the prior art polymers used, the use of additives is often necessary in order to optimize further properties. Thus, various mixtures are known in the prior art for reducing the viscosity of the melts and for lowering the material shrinkage caused by crystallization. However, this has happened in each case only with slight success. Although the use of different types of fillers leads to the crystallization being disturbed and thus to the material shrinkage being reduced, the disadvantage of such fillers, however, is that the viscosity of the melts is adversely affected.

Against this background, it has also been attempted in the prior art to optimize the additives as such through a special selection, where, in this connection, preference is given to using those additives which are intended to primarily result in a softening of the material. These additives generally lead to a lower melt viscosity and to a lower tension in the material, although the properties of the compositions in this regard are still not optimal with regard to their suitability as blocking agent component.

In this connection, further prior art compositions and also their specific properties are listed below, in particular in table form. The tables given contain in particular information about the mixtures used and also an assessment of the adhesion of the material to a polycarbonate lens which is laminated with a protective film. Moreover, statements relating to the haptics of the cured material, the viscosity of the melt and the effects of the material shrinkage during curing are given. In the case of the viscosity, an assessment as "low" or "moderate" is to be understood as meaning pourable melts. Melts with high viscosity can in most cases only be poured with great difficulties or cannot be processed at all. In the case of melts with an excessively high viscosity, a pouring or a casting is impossible in each case.

In the course of preliminary experiments, noninventive compositions based on polycaprolactone (PCL) and—especially for avoiding cracking—a thermoplastic elastomer (TE) are used. The results in this regard and properties of the noninventive compositions are given in table 1 below.

TABLE 1

| Sample | Adhesion | Haptics | Melting point | Viscosity |
|---|---|---|---|---|
| PCL | good | good | 60° C. | low |
| TE | good | good | 75° C. | too high |
| PCL/TE (10:1) | good | Polymers are not miscible. | | |
| PCL/TE (3:1) | good | | | |
| PCL/TE (1:1) | none since the polymers do not adhere to one another | | | |
| PCL/TE (1:10) | good | | | |

The materials used are always present in the mixed form, for which reason no improvement in shrinkage is established. The pure thermoplastic elastomer is, moreover, too soft for use as blocking agent composition.

In a further complex, compositions based on polyesters are used where, in this regard, polyesters with varying flexibility (rigid polyester=RP, flexible polyester=FP and highly flexible polyester=HFP) are used. The polyesters were also tested in different mixtures. Table 2 shows the results in this regard.

TABLE 2

| Sample | Adhesion | Haptics | Melting point | Viscosity | Shrinkage |
|---|---|---|---|---|---|
| RP | good | good | 60° C. | low | cracked |
| FP | good | too soft | 60° C. | low | cracked |
| HFP | good | good | 60° C. | low | many cracks |
| RP/FP (1:1) | good | too soft | 60° C. | low | cracked |

In this regard, it is also observed that the effect of the material shrinkage and thus the crack formation are dependent on the shape and the amount of material.

In the course of a further investigation complex, polyesters with fillers are processed, the first tested filler A being present in particulate form. In this connection, a mixture with FP in the ratio FP to filler A of 4:1 is carried out. Here, it is found that the mixing takes place only with difficulty. Moreover, aggregation of the particles arises and the viscosity of the melt is increased. Moreover, the material becomes brittle and is thus not suitable for use as blocking agent.

Table 3 below shows results which are achieved with mixtures of the rigid polyester RP with a filler B. Filler B is likewise a particulate material, although it can be mixed easily with the polyesters used. The parts by weight data describes the fraction of the filler B in the mixture.

TABLE 3

| Sample | Adhesion | Haptics | Melting point | Viscosity | Shrinkage |
|---|---|---|---|---|---|
| 1 pt. by wt. | good | good | 60° C. | low | cracked |
| 0.5 pt. by wt. | good | good | 60° C. | low | cracked |
| 0.1 pt. by wt. | good | good | 60° C. | low | cracked |
| 0.01 pt. by wt. | good | good | 60° C. | low | cracked |

All samples exhibit very similar properties. Since the crack formation occurs later compared to pure RP, it can be concluded that the filler has a certain effect. However, this effect can only be achieved up to a certain degree. Increasing the filler fraction from 0.5 pt. by wt. to 1 pt. by wt. does not exhibit any effect on the material shrinkage.

Furthermore, flexible polyesters with higher molecular weights are tested. These are mixed with flexible polyesters with a low molecular weight. The filler B is added to these mixtures. The parts by weight data gives the fraction of filler B.

TABLE 4

| Sample | Adhesion | Haptics | Melting point | Viscosity | Shrinkage |
|---|---|---|---|---|---|
| 1 pt. by wt. | good | good | 60° C. | low | cracks |
| 2.5 pts. by wt. | good | good | 60° C. | low | cracks |
| 3.8 pts. by wt. | good | good | 60° C. | low | few cracks |
| 5.7 pts. by wt. | good | good | 60° C. | moderate | few cracks |
| 9.1 pts. by wt. | good | good | 60° C. | very high | few cracks |
| 16.7 pts. by wt. | | good | 60° C. | does not flow | |

Although the crack formation can also be reduced on the basis of this composition, it cannot be prevented. Above a filler fraction of about 5 pts. by wt., an increase in the viscosity becomes evident from a negative aspect. At a filler fraction of about 15 pts. by wt., the melt is too viscous for processing.

In table 5 below, further experiments with mixtures of FP in combination with filler B are listed. The parts by weight data refer to the fraction of filler B.

TABLE 5

| Sample | Adhesion | Haptics | Melting point | Viscosity | Shrinkage |
|---|---|---|---|---|---|
| 1.7 pts. by wt. | good | acceptable | 65° C. | low | few cracks |
| 4.3 pts. by wt. | good | good | 65° C. | moderate | few cracks |
| 8.2 pts. by wt. | good | good | 65° C. | moderate | few cracks |

Although all samples only exhibit cracks with delay, even in this case, complete avoidance of the crack formation cannot be achieved.

Since the effectiveness of filler B is limited, a further filler C based on polymer is tested. Two variants are investigated. Firstly, the mixing of RP with filler C and, secondly, the mixing of FP with filler C. Table 6 below shows the results which are obtained with mixtures based on RP and filler C. The fraction by weight data describes the filler fraction in the composition.

TABLE 6

| Sample | Adhesion | Haptics | Melting point | Viscosity | Shrinkage |
|---|---|---|---|---|---|
| 4.5 pts. by wt. | good | good | 60° C. | low | cracks |
| 8.4 pts. by wt. | good | good | 65° C. | low | cracks |
| 12.2 pts. by wt. | good | good | 70° C. | moderate | few cracks |
| 15.9 pts. by wt. | good | good | 80° C. | moderate | very few cracks |

The filler C can reduce the crack formation somewhat more than the filler B. However, it results in negative effects not only on the viscosity, but also on the melting point.

Mixtures of flexible polyesters with filler C are then tested. Firstly, FP with filler C in the ratio of 84 to 16 parts by weight is prepared. The results with regard to this are also unsatisfactory.

For the experiments listed in table 7 below, the polyester RP is mixed with a soft additive (referred to hereinbelow as SA). The percentage data refers to the weight fraction of the additive.

TABLE 7

| Sample | Adhesion | Haptics | Melting point | Viscosity | Shrinkage |
|---|---|---|---|---|---|
| 50.7 pts. by wt. | | brittle | 60° C. | too high | |
| 23 pts. by wt. | | brittle | 60° C. | too high | |
| 12.1 pts. by wt. | | brittle | 60° C. | too high | |
| 8 pts. by wt. | | brittle | 60° C. | too high | |
| 3.9 pts. by wt. | satisfactory | satisfactory | 60° C. | moderate | cracks |

Since the additive SA is mixed heterogeneously with the polyester, high additive fractions result in a high viscosity of the melt. If the fraction is reduced so much that the viscosity is acceptable, cracks arise in the material.

In further investigations, the polyester RP is again mixed with the soft additive SA, but in smaller fractions than previously. Additionally, the filler B is used. Table 7 below contains the weight fractions of the components used in the "sample" column.

TABLE 8

| Sample RP1/SA1/ filler B | Adhesion | Haptics | Melting point | Viscosity | Shrinkage |
|---|---|---|---|---|---|
| 95.5/3.6/0.9 | good | good | 70° C. | moderate | cracks |
| 92.0/3.5/4.5 | good | good | 80° C. | high | cracks |
| 94.3/2.5/3.2 | good | good | 80° C. | moderate | cracks |
| 93.8/2.3/3.9 | good | good | 80° C. | moderate | many cracks |

The addition of SA and filler B does not lead to a prevention of the crack formation.

Since both the effect of SA and also of filler B is limited, the polyester is tested again with filler C (table 9).

TABLE 9

| Sample RP/ filler C SA | Adhesion | Haptics | Melting point | Viscosity | Shrinkage |
|---|---|---|---|---|---|
| 0/16.5/83.5 | | wax | 60° C. | low | |
| 76/15/9 | | good | 90° C. | too high | |
| 70/13/17 | | brittle | 80° C. | moderate | |

TABLE 9-continued

| Sample RP/ filler C SA | Adhesion | Haptics | Melting point | Viscosity | Shrinkage |
|---|---|---|---|---|---|
| 74/17/12 | | brittle | 90° C. | moderate | |
| 91.7/7.4/0.9 | good | good | 70° C. | low | cracks |
| 79.8/15.2/5.0 | good | good | 90° C. | moderate | cracks |
| 77/18/5 | good | good | 90° C. | moderate | cracks |
| 75.1/20/4.9 | | good | 90° C. | too high | |
| 74/20/6 | | good | 90° C. | too high | |
| 73.2/19.8/7 | | good | 90° C. | too high | |
| 72.4/19.6/8 | | good | 90° C. | too high | |
| 70.9/19.1/10 | | good | 90° C. | too high | |
| 66.9/18.1/15 | | good | 90° C. | too high | |
| 66.9/18.1/15 | good | good | 90° C. | moderate | few cracks |
| 61.3/16.6/22.1 | good | good | 90° C. | good | cracks |
| 65.3/20/14.6 | good | good | 90° C. | good | few cracks |
| 62/19/19 | good | good | 90° C. | good | many cracks |

The mixing of RP1 with filler C even leads to a significant reduction in material shrinkage, although cracks cannot be prevented entirely. The addition of SA2 leads to a lowering in the viscosity, although this is only successful to a certain extent. No reduction in crack formation is evident here.

Furthermore, an attempt is pursued to again add SA to a mixture of polyester RP, filler C and soft additive SA in order to reduce the material shrinkage so much that the crack formation is also further reduced. Table 10 below contains the list of tested samples with the weight fractions of the respective components.

TABLE 10

| Sample RP/ filler C SA/SA | Adhesion | Haptics | Melting point | Viscosity | Shrinkage |
|---|---|---|---|---|---|
| 61.4/18.8/18.8/1 | good | good | 90° C. | moderate | cracks |
| 60.7/18.6/18.6/2.1 | good | good | 90° C. | high | cracks |
| 60/18.4/18.4/3.2 | good | good | 90° C. | high | few cracks |
| 59.6/18.2/18.2/4.0 | good | good | 90° C. | high | cracks |
| 58.9/18.1/18.1/4.9 | good | good | 90° C. | high | cracks |
| 66.0/15.0/15.0/4.0 | good | good | 90° C. | moderate | few cracks |
| 74.6/11.2/11.2/3.0 | good | good | 90° C. | low | cracks |
| 70.4/15.0/10.6/4.0 | good | good | 90° C. | moderate | few cracks |
| 67.8/18/10.2/4.0 | good | good | 90° C. | high | cracks |
| 66.1/20.1/9.9/3.9 | | good | 90° C. | too high | |
| 64.6/19.6/12.0/3.8 | good | good | 90° C. | moderate | cracks |
| 62.3/19.0/15.0/3.7 | good | good | 90° C. | moderate | few cracks |
| 60/20/16/4 | good | good | 90° C. | moderate | few cracks |
| 58/20/18/4 | good | good | 90° C. | low | few cracks |
| 55/21/20/4 | good | good | 90° C. | moderate | few cracks |
| 48.2/24.1/23.8/3.9 | | good | 90° C. | too high | |
| 46.9/23.4/25.9/3.8 | good | good | 90° C. | low | few cracks |
| 46.4/23.2/25.7/4.7 | The melts clump, the last two melts listed are wax-like on account of the high SA2 fraction | | | | |
| 45.2/22.7/27.5/4.6 | | | | | |
| 39.0/28.9/28.2/3.9 | | | | | |
| 36.1/26.8/33.5/3.6 | | | | | |
| 34.3/25.4/36.9/3.4 | | | | | |
| 39.1/23.6/34.1/3.2 | | | | | |

The mixing of mixtures based on RP and filler C and SA with further SA leads to a slight reduction in shrinkage, although crack formation can in no way be prevented. Moreover, it is disadvantageous that the viscosity drastically increases as a result of the addition of SA.

In parallel to the attempt with soft additives, an attempt using a liquid plasticizer, also referred to hereinbelow as PL, is investigated. Firstly, this is mixed with a flexible polyester FP and tested. Table 11 below shows the results, stating the weight fraction of PL.

TABLE 11

| Sample | Adhesion | Haptics | Melting point | Viscosity | Shrinkage |
|---|---|---|---|---|---|
| 1.8 pts. by wt. |  | good | 70° C. | too high |  |
| 4.6 pts. by wt. |  | good | 70° C. | too high |  |
| 14.4 pts. by wt. | good | good | 70° C. | very high | no cracks |
| 21.2 pts. by wt. | good | good | 70° C. | high | no cracks |
| 25.1 pts. by wt. | good | satisfactory | 70° C. | high | no cracks |
| 27.0 pts. by wt. | good | satisfactory | 70° C. | high | no cracks |
| 30.0 pts. by wt. | good | satisfactory | 70° C. | high | no cracks |
| 35.0 pts. by wt. | slight | greasy | 70° C. | high | no cracks |
| 36.5 pts. by wt. | slight | greasy | 70° C. | high | no cracks |

It is disadvantageous that the investigated compositions cure considerably less well. Thus, the time before they are fit for transportation and also before further processing is significantly extended. Smaller admixtures lead to a reduction in viscosity, although this is too high in all cases to satisfy the demands of a blocking agent composition. Since the miscibility of the plasticizer with FP is low, higher weight fractions of the plasticizer do not lead to a reduction in viscosity. In the case of high fractions, the material, moreover, exhibits a film of the plasticizer on the surface, which leads to greasy haptics. In the case of very high fractions, this also has a disadvantageous effect on the adhesion of the material.

In a further mixture, a polyester with a lower molecular weight and thus with a lower melt viscosity is admixed. For this purpose, FP3 is selected. Table 12 below gives the weight fractions of all components, namely FP3, FP9 and plasticizer.

TABLE 12

| Sample FP3/FP9/PL | Adhesion | Haptics | Melting point | Viscosity | Shrinkage |
|---|---|---|---|---|---|
| 80.0/20.0/0 | good | moderate | 70° C. | low | cracks |
| 72.0/18.0/10.0 | good | moderate | 70° C. | low | cracks |
| 63.9/24.4/11.7 | good | moderate | 70° C. | low | cracks |
| 52.9/33.1/14.0 | good | moderate | 70° C. | low | cracks |
| 48.7/36.4/14.9 | good | moderate | 70° C. | low | cracks |
| 43.8/40.3/15.9 | good | moderate | 70° C. | low | cracks |
| 42.0/38.7/19.3 | slight | greasy | 70° C. | very low | cracks |
| 39.1/44.6/16.3 | good | moderate | 70° C. | low | cracks |
| 22.1/58.4/19.5 | good | moderate | 70° C. | very high | cracks |
| 28.2/53.9/17.9 |  | moderate | 70° C. | too high |  |
| 27.5/52.5/20.0 | good | moderate | 70° C. | very low | few cracks |

By adding the low molecular weight polyester FP3, although the viscosity can be reduced, despite using the plasticizer, however, cracks universally arise in these materials. As the plasticizer fraction increases, the time before crack formation can indeed be extended, but not the crack formation as such.

In a further approach, a further rigid polyester (RP) is used and blended with a plasticizer (PL). In order to increase the miscibility, a phase promoter (PP) is also used. Table 13 below shows the results achieved. As the sample numbers increase, the fraction of phase promoter increases, while the fractions of the other two components decrease.

TABLE 13

| Sample | Adhesion | Haptics | Melting point | Viscosity | Shrinkage |
|---|---|---|---|---|---|
| 1 | slight | greasy | 70° C. | low | cracks |
| 2 | good | satisfactory | 70° C. | low | few cracks |
| 3 | good | good | 70° C. | low | no cracks |

The plasticizer fraction in the mixture barely differs in all three samples. However, by adding the phase promoter, certain property improvements can be achieved with regard to the avoidance of cracks and with regard to improved haptics. However, the properties of the compositions listed above are not optimal.

Thus, overall, on account of their not always positive properties, the further prior art compositions listed above are not suitable for use as blocking agent composition.

Rather, it has only been possible in the course of the present invention, in a completely surprising manner, to develop a blocking agent based on polymer which can be used as replacement for a metal alloy, in particular with a softening point of about 50° C., where the softening point of the compositions according to the invention should ideally not exceed a temperature of 70° C., in order to avoid straining of the lens during curing.

Furthermore, the compositions according to the invention, compared with prior art compositions, are characterized by a significantly reduced material shrinkage as a result of curing, which leads to an avoidance of cracks in the material and also to a slight deviation along the block piece axis. Moreover, the compositions according to the invention exhibit a low viscosity of the melt, which leads to exceptional pourability. The curing of the material is also rapid, which leads to an ability to be transported after a short time, in particular after 20 s, and to a rapid curing for further processing, which can take place after just 30 min. Moreover, the compositions according to the invention have no wax-like haptics. A further advantage of the compositions according to the invention is that these can be recycled and/or can be reused, which is advantageous not least with regard to costs and logistics.

Furthermore, the compositions according to the invention can ideally be removed mechanically from the lens since the compositions according to the invention can be detached from the lens and the block piece without major effort and without leaving a residue. Moreover, detached material particles of the composition according to the invention can be removed easily and residue-free. Furthermore, the compositions according to the invention have excellent intrinsic rigidity, meaning that these can withstand the processing forces resulting from the working, such as turning, milling, polishing etc. In particular, the mechanical properties of the compositions according to the invention come as close as possible to those of a metal alloy, where the compositions according to the invention are even, as discussed above, reutilized and, moreover, do not have toxic properties. In particular, the compositions according to the invention satisfy the following properties:

slight shape deviation during the prevailing processing forces in the range of the operating temperature. Typical temperatures in this regard are, with regard to the lens to be worked and the block piece composite, in particular room temperature, with regard to the polishing means about 12° C. and with regard to the cooling lubricant, which is used for example during milling and/or turning, about 35° C.;

good vaporization properties;

slight give in the material and slight shape deviation (peak to valley) (PV) caused as a result; in particular, the shape deviation does not exceed the value of about 5 µm, which corresponds to the difference in the actual shape deviation with regard to a machine-caused shape deviation;

resistance to high processing forces, the greatest processing force arising in particular during a milling process.

Moreover, the compositions according to the invention are characterized in that they are at least essentially inert towards the atmosphere of a coating plant, meaning that no reaction of the adhesive and no contamination of the atmosphere or of the baths used in this regard is present.

Moreover, the composition according to the invention does not constitute a hazardous material with regard to storage, handling and disposal. Moreover, the compositions according to the invention are stable against the impact of water, as can be present for example as a result of polishing media, cooling emulsion, turning etc. Furthermore, the compositions according to the invention are cost-effective.

In the course of the present invention, it has been possible to provide a polymer-based composition which does not have the negative properties of metal alloys, but where at the same time the positive properties continue to be present, or can even be further improved.

Overall, the compositions according to the invention have significant advantages over the compositions of the prior art, meaning that in the course of the present invention it has been possible to provide high-performance blocking agent compositions which are suitable in particular for the fixing of blanks for ophthalmic or optical lenses, preferably for plastics material-based spectacle glass blanks.

ANNEX

Abbreviations used:
Thermoplastic elastomer (TE): Poly(ethylene-co-vinyl acetate), (25% by weight vinyl acetate)
Rigid polyester (RP): Polyethylene adipate (PEA)
Flexible polyester (FP): Polybutylene adipate (PBA)
Highly flexible polyester (HFP): Polyhexylene adipate (PHA)
Filler A: $SiO_2$ nanoparticles (5 to 15 nm)
Filler B: Furnace soot
Filler C: Poly(methacrylate)
Soft additive 1 (SA1): Stearyl alcohol
Soft additive 2 (SA2): Polyethylene glycol adipate
Plasticizer (PL): Bis(2-ethylhexyl)adipic acid ester
Phase promoter (PP): Poly(ethylene-co-butylene) adipate

The invention claimed is:
1. A composition in the form of a blocking agent composition for fixing blanks for ophthalmic or optical lenses, wherein the composition comprises a mixture, wherein the mixture comprises:
    (a) at least one polyol, wherein the polyol comprises units derived from bisphenol A and dimethylolpropionic acid, wherein the composition comprises the polyol in amounts of
        from 5 to 50% by weight, based on the composition, and
    (b) at least one organic polyester, wherein (i) the polyester is selected from linear copolyesters comprising primary hydroxyl functionalities, and (ii) the composition comprises the organic polyester in amounts of from 50 to 95% by weight, based on the composition.
2. The composition as claimed in claim 1, wherein the polyol has the following formula:

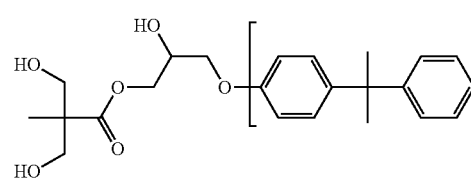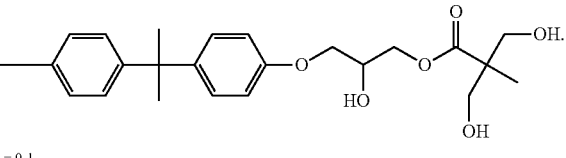

3. The composition as claimed in claim 1, wherein the polyester has a molecular weight in the range from 1000 to 15 000 Daltons (Da) and wherein the polyester has a hydroxyl number in the range from 1 to 80 mg KOH/g.
4. The composition as claimed in claim 1, wherein the polyester has a ring and ball softening point in the range from 40 to 90° C. and wherein the polyester has a glass transition temperature in the range from −70 to 40° C.
5. The composition as claimed in claim 1, wherein the polyester has a melting range or a melting temperature in the range from 30 to 80° C.
6. A method for fixing blanks for ophthalmic or optical lenses, wherein
    (a) firstly, the blank is arranged above or laterally to a carrier in such a way that the side or surface of the blank to be processed faces away from the carrier and in such a way that a fillable cavity results between the carrier on the one hand and the blank on the other hand;
    (b) then the cavity is at least essentially completely filled with a composition as defined in claim 1, which is liquefied or converted to a flowable state; and
    (c) then the composition is cured or solidified to give a composite having the carrier with the blank fixed thereon by means of the composition as defined in claim 1.
7. A composite having at least one carrier and also a blank, fixed to the carrier, for ophthalmic or optical lenses, wherein the blank is fixed to the carrier with a composition as defined in claim 1.
8. A method for producing an ophthalmic or optical lens, wherein
    (a) firstly, a blank for ophthalmic or optical lenses is arranged above or laterally to a carrier in such a way that the side or surface of the blank to be processed faces away from the carrier, and in such a way that a fillable cavity results between the carrier on the one hand and the blank on the other hand;
    (b) then the cavity is at least essentially completely filled with a composition as defined in claim 1, which is liquefied or converted to a flowable state;

(c) then the composition is cured or solidified to give a composite having the carrier with the blank fixed thereon by means of the composition; and (d) finally, a processing of the blank fixed on the carrier takes place and, in this way, the ophthalmic or optical lens is obtained.

9. An ophthalmic or optical lens, the ophthalmic or optical lens being obtainable by a method as defined in claim 8.

10. A composition in the form of a blocking agent composition for fixing blanks for ophthalmic or optical lenses,
    wherein the composition comprises a mixture,
    wherein the mixture comprises:
    (a) at least one polyol, wherein the polyol comprises units derived from bisphenol A and dimethylolpropionic acid, wherein (i) the composition comprises the polyol in amounts of from 5 to 50% by weight, based on the composition, and (ii) the polyol has the following formula:

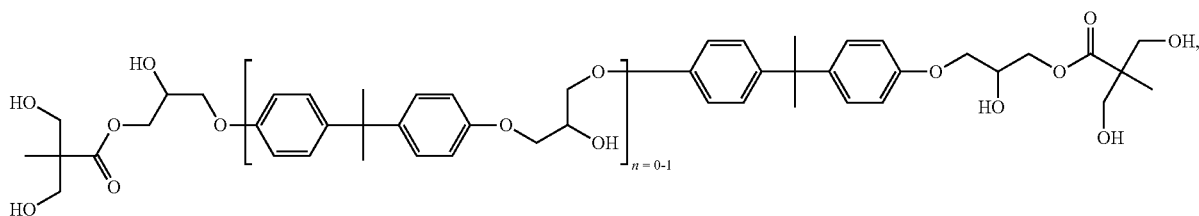

and
    (b) at least one organic polyester, wherein (i) the polyester is selected from linear copolyesters comprising primary hydroxyl functionalities, and (ii) the composition comprises the organic polyester in amounts of from 50 to 95% by weight, based on the composition.

11. A composition in the form of a blocking agent composition for fixing blanks for ophthalmic or optical lenses,
    wherein the composition comprises a mixture,
    wherein the mixture comprises:
    (a) at least one polyol, wherein (i) the polyol comprises units derived from bisphenol A and dimethylolpropionic acid, and (ii) the composition comprises the polyol in amounts of from 5 to 50% by weight, based on the composition, and (iii) the polyol has the following formula:

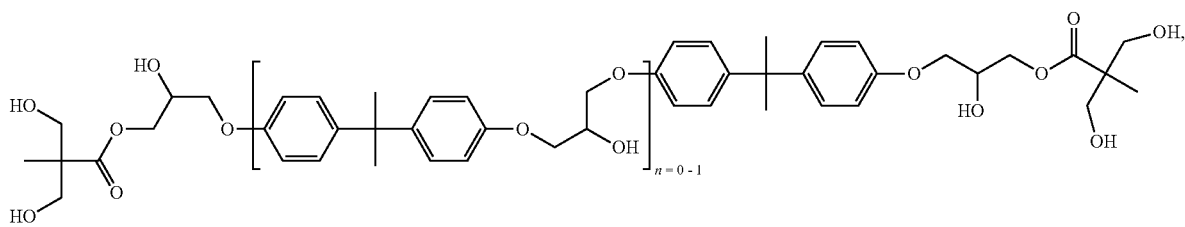

and
    (b) at least one organic polyester, wherein (i) the polyester is selected from linear copolyesters comprising primary hydroxyl functionalities, (ii) the composition comprises the organic polyester in amounts of from 50 to 95% by weight, based on the composition, (iii) the polyester has a molecular weight in the range from 1000 to 15 000 Daltons (Da) and (iv) the polyester has a hydroxyl number in the range from 1 to 80 mg KOH/g.

12. A composition in the form of a blocking agent composition for fixing blanks for ophthalmic or optical lenses,
    wherein the composition comprises a mixture,
    wherein the mixture comprises:
    (a) at least one polyol, wherein the polyol comprises units derived from bisphenol A and dimethylolpropionic acid, wherein (i) the composition comprises the polyol in amounts of from 5 to 50% by weight, based on the composition, and (ii) the polyol has the following formula:

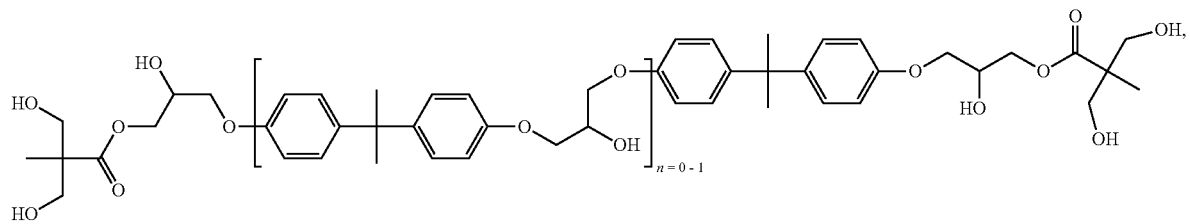

and
   (b) at least one organic polyester, wherein the polyester is selected from linear copolyesters comprising primary hydroxyl functionalities, wherein (i) the composition comprises the organic polyester in amounts of from 50 to 95% by weight, based on the composition, (ii) the polyester has a ring and ball softening point in the range from 40 to 90° C. and (iii) the polyester has a glass transition temperature in the range from −70 to 40° C.

13. A composition in the form of a blocking agent composition for fixing blanks for ophthalmic or optical lenses,
   wherein the composition comprises a mixture,
   wherein the mixture comprises:
   (a) at least one polyol, wherein the polyol comprises units derived from bisphenol A and dimethylolpropionic acid, wherein (i) the composition comprises the polyol in amounts of from 5 to 50% by weight, based on the composition, and (ii) the polyol has the following formula:

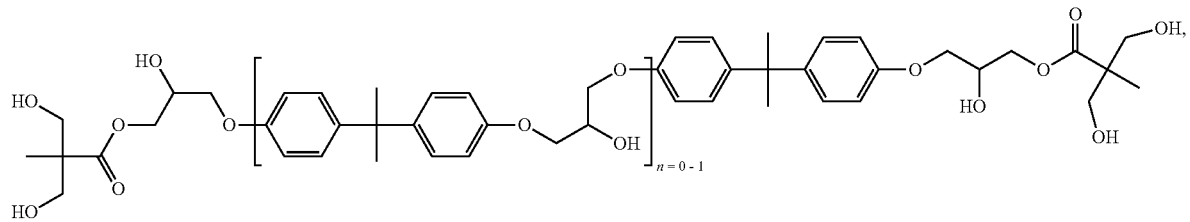

and
   (b) at least one organic polyester, wherein the polyester is selected from linear copolyesters comprising primary hydroxyl functionalities, wherein (i) the composition comprises the organic polyester in amounts of from 50 to 95% by weight, based on the composition, and (ii) the polyester has a melting range or melting temperature in the range from 30 to 80° C.

14. A composition in the form of a blocking agent composition for fixing blanks for ophthalmic or optical lenses,
   wherein the composition comprises a mixture,
   wherein the mixture comprises:
   (a) at least one polyol, wherein the polyol comprises units derived from bisphenol A and dimethylolpropionic acid, wherein (i) the composition comprises the polyol in amounts of from 5 to 50% by weight, based on the composition, and (ii) the polyol has the following formula:

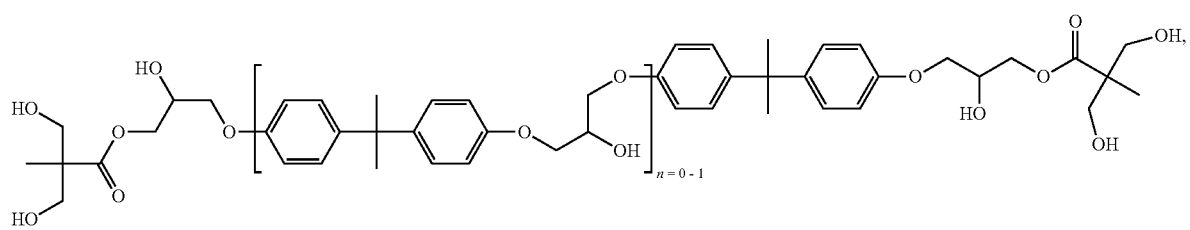

and
(b) at least one organic polyester, wherein the polyester is selected from linear copolyesters comprising primary hydroxyl functionalities, wherein (i) the composition comprises the organic polyester in amounts of from 50 to 95% by weight, based on the composition, (ii) the polyester has a molecular weight in the range from 1000 to 15 000 Daltons (Da), (iii) the polyester has a hydroxyl number in the range from 1 to 80 mg KOH/g, (iv) the polyester has a ring and ball softening point in the range from 40 to 90° C., (v) the polyester has a glass transition temperature in the range from −70 to 40° C., and (vi) the polyester has a melting range or melting temperature in the range from 30 to 80° C.

\* \* \* \* \*